US011306212B2

(12) United States Patent
Inoue et al.

(10) Patent No.: US 11,306,212 B2
(45) Date of Patent: Apr. 19, 2022

(54) TRANSPARENT RESIN COMPOSITION, TRANSPARENT COATING FILM AND TRANSPARENT RESIN-COATED GLASS SUBSTRATE

(71) Applicant: Toray Industries, Inc., Tokyo (JP)

(72) Inventors: Yoshihiko Inoue, Otsu (JP); Yusuke Fukuzaki, Otsu (JP); Hirokazu Iimori, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 121 days.

(21) Appl. No.: 16/613,477

(22) PCT Filed: May 16, 2018

(86) PCT No.: PCT/JP2018/018949
§ 371 (c)(1),
(2) Date: Nov. 14, 2019

(87) PCT Pub. No.: WO2018/216571
PCT Pub. Date: Nov. 29, 2018

(65) Prior Publication Data
US 2021/0009808 A1    Jan. 14, 2021

(30) Foreign Application Priority Data
May 24, 2017  (JP) .............................. JP2017-102293

(51) Int. Cl.
| C09D 183/04 | (2006.01) |
| B32B 17/10 | (2006.01) |
| C09D 5/00 | (2006.01) |
| C03C 17/30 | (2006.01) |
| C08L 83/04 | (2006.01) |

(52) U.S. Cl.
CPC ............... *C09D 5/00* (2013.01); *B32B 17/10* (2013.01); *C03C 17/30* (2013.01); *C08L 83/04* (2013.01); *C09D 183/04* (2013.01)

(58) Field of Classification Search
None
See application file for complete search history.

(56) References Cited

U.S. PATENT DOCUMENTS

| 9,511,602 B2 | 12/2016 | Koganehira et al. | |
| 2017/0022343 A1* | 1/2017 | Sakakibara | ............... B32B 7/12 |
| 2017/0037269 A1* | 2/2017 | Isobe | ..................... C09D 11/03 |
| 2018/0065349 A1* | 3/2018 | Washio | ................... B32B 27/20 |

FOREIGN PATENT DOCUMENTS

| JP | 2006145735 A * | 6/2006 |
| JP | 4502784 B2 * | 7/2010 |
| JP | 2012155644 A | 8/2012 |
| JP | 2013028130 A | 2/2013 |
| JP | 2013087207 A | 5/2013 |
| JP | 2014114446 A | 6/2014 |
| JP | 2014228615 A | 12/2014 |
| JP | 2016017172 A | 2/2016 |
| JP | 2016124720 A | 7/2016 |
| JP | 2017142475 A | 8/2017 |
| WO | 2014030599 A1 | 2/2014 |
| WO | 2016063719 A1 | 4/2016 |
| WO | 2017145720 A1 | 8/2017 |
| WO | 2018025498 A1 | 2/2018 |

OTHER PUBLICATIONS

JP 4502784 English machine translation (2010).*
English machine translation of JP-2006145735 (2006).*
International Search Report and Written Opinion for International Application No. PCT/JP2018/018949, dated Aug. 21, 2018, 7 pages.

* cited by examiner

*Primary Examiner* — Kenneth J Stachel
(74) *Attorney, Agent, or Firm* — RatnerPrestia

(57) ABSTRACT

A transparent resin composition is provided which contains at least (A) a siloxane resin, (B) an organic solvent, and two or more kinds of (C) surfactants, wherein the surfactants include (C1) a silicone-modified acrylic surfactant and (C2) a thermally decomposable fluorine-containing surfactant, and the total content of the surfactants (C1) and (C2) is 50-500 ppm with respect to the transparent resin composition. Further provided is a transparent resin composition from which a transparent coating film, that suppresses pin hole or unevenness and has a good appearance and an excellent adhesion property to an inorganic film or an organic film, can be formed even when coated by spray coating or inkjet coating.

8 Claims, No Drawings

TRANSPARENT RESIN COMPOSITION, TRANSPARENT COATING FILM AND TRANSPARENT RESIN-COATED GLASS SUBSTRATE

CROSS REFERENCE TO RELATED APPLICATIONS

This is the U.S. National Phase application of PCT/JP2018/018949, filed May 16, 2018, which claims priority to Japanese Patent Application No. 2017-102293, filed May 24, 2017, the disclosures of these application being incorporated herein by reference in their entireties for all purposes.

FIELD OF THE INVENTION

The present invention relates to a transparent resin composition containing a siloxane resin, an organic solvent, and a surfactant, and to a transparent coat film and a transparent resin coated glass substrate produced therefrom.

BACKGROUND OF THE INVENTION

In recent years, various display terminals such as wearable terminals, smartphones, and tablet PCs (personal computers) generally have structures containing a display panel such as liquid crystal display device and organic EL (electroluminescence) display device with a front panel that has a cover glass plate with a decorative film attached thereto with a printing ink etc. Some display terminals use touch-sensitive cover glass having transparent electrodes formed on the glass. These display terminals, however, are generally disadvantageous in that the cover glasses are liable to breakage when dropped due to a low strength of the glass itself of the cover glass or due to a decrease in the glass strength caused by the inorganic film such as transparent electrode on the glass.

Regarding the touch-sensitive cover glass, there is a proposal of combining a cover glass layer and a touch-sensitive panel in to one plate that functions as both a cover glass layer and a touch-sensitive layer, which is produced by forming a conductive film and a sensor directly on a cover glass. In most of these structures, a light blocking layer is formed on a glass and then conductive films and ITO wiring are formed on top of the light blocking layer. To produce a cover glass-integrated touch-sensitive panel, there is a proposal, for example, of a method for production of a decorative cover glass-integrated touch-sensitive panel including a step for forming decorative portions on a cover glass substrate by the screen printing technique, a step for polishing the decorative portions on the cover glass substrate, a step for forming an overcoat layer on the cover glass substrate, a step for forming touch-sensitive panel sensors on the overcoat, a step for cutting the cover glass substrate to separate each touch-sensitive panel sensor, which are carried out in this order (see, for example, Patent document 1). This production method, however, is disadvantageous in that the glass is not sufficiently high in strength.

Accordingly, as strength improving techniques, there have been proposals of, for example, a sensor-integrated cover glass containing a glass plate, a transparent conductive film, and a substrate insulating film formed of a transparent organic compound (see, for example, Patent document 2), a substrate containing a translucent chemically strengthened glass substrate and a resin layer to serve as a protective plate in a display device (see, for example, Patent document 3), and a plate containing a reinforced glass plate, a transparent conductive film, and a cured film to serve as a front plate of an image display device (see, for example, Patent document 4).

Useful methods for forming a resin layer include, for example, coating techniques such as ink jet coating and spray coating. Suitable resin compositions for ink jet coating include, for example, an ink jet type coating liquid composed mainly of an oxazoline group-containing resin, an alkane diol having 7 or more carbon atoms, a surfactant, and water (see, for example, Patent document 5), and an ink jet type ink composed mainly of a hydroxy group-containing carboxylic acid ester having 6 or less carbon atoms, a surfactant, and water (see, for example, Patent document 6).

On the other hand, to provide a composition suitable for application of a coating material, there is a proposal of a resist composition including a fluorine-containing heat-decomposable resin that has a backbone chain of a polymer structure incorporating polymerizable monomers, a side chain having a fluorinated alkyl group or a poly(perfluoroalkylene ether) chain, and a side chain having a specific functional group (see, for example Patent document 7).

PATENT DOCUMENTS

Patent document 1: Japanese Unexamined Patent Publication (Kokai) No. 2012-155644
Patent document 2: International Publication WO 2014/30599
Patent document 3: Japanese Unexamined Patent Publication (Kokai) No. 2014-228615
Patent document 4: Japanese Unexamined Patent Publication (Kokai) No. 2016-124720
Patent document 5: Japanese Unexamined Patent Publication (Kokai) No. 2013-28130
Patent document 6: Japanese Unexamined Patent Publication (Kokai) No. 2013-87207
Patent document 7: Japanese Unexamined Patent Publication (Kokai) No. 2016-17172

SUMMARY OF THE INVENTION

In recent years, there have been studies on the formation of a cover glass-integrated sensor using a diced and chemical reinforced glass plate with the aim of providing a cover glass-integrated touch-sensitive panel with further increased strength, and the formation of a cover glass-integrated sensor using a curved glass plate with the aim of achieving improved design characteristics. From the viewpoint of productivity, it is difficult to apply a resin composition on a diced glass plate or a curved glass plate using a conventional slit coater or a spinner. On the other hand, regarding ink jet coating and spray coating, the use of the techniques described in Patent document 5 or 6 for a cover glass-integrated touch-sensitive panel is not suitable from the viewpoint of appearance due to coating problems such as pin hole and unevenness that occurs when drying the coated film. Regarding the resist composition described in Patent document 7, furthermore, the formation of a transparent resin film on a glass layer aiming to improve the glass strength is followed by forming a colored film by spreading a coloring ink on the transparent resin film to improve the design characteristics or forming a transparent inorganic film to serve as an optical adjustment layer, but in these steps, there tends to occur the problem of interfacial delamination due to a difference in thermal expansion coefficient. In view of these problems with conventional technology, the main object of the present invention is to provide a transparent resin composition that can avoid pin hole and uneven coating and form a transparent coat film that can give a good appearance and achieve strong adhesion to inorganic films and organic films even when applied by such techniques as spray coating and ink jet coating.

As a result of intensive studies performed for the purpose of solving the problems with the conventional techniques, the inventors have found that the object of the invention can be met by using a siloxane resin as matrix resin of a transparent resin composition and using a plurality of specific surfactants in combination.

Specifically, the object of the invention is achieved by the following constitution.

A transparent resin composition including at least a siloxane resin (A), an organic solvent (B), and a plurality of surfactants (C), the surfactants including a silicon modified acrylic surfactant (C1) and a fluorine-containing heat-decomposable surfactant (C2), and the total content of the surfactants (C1) and (C2) being 50 ppm or more and 500 ppm or less in the transparent resin composition.

The present invention serves to avoid pin hole and uneven coating and form a transparent coat film having a good appearance even when applied by such techniques as spraying and ink jet. Furthermore, the use of the transparent resin composition according to the present invention serves to provide a transparent coat film that can achieve strong adhesion to inorganic films and organic films.

DETAILED DESCRIPTION OF EMBODIMENTS OF THE INVENTION

The invention will be described in more detail below.

The transparent resin composition according to the present invention is characterized by including at least a siloxane resin (A), an organic solvent (B), and a plurality of surfactants (C), the surfactants including a silicon modified acrylic surfactant (C1) and a fluorine-containing heat-decomposable surfactant (C2), and the total content of the surfactants (C1) and (C2) being 50 ppm or more and 500 ppm or less in the transparent resin composition. The siloxane resin (A) works to improve the transparency of the resin composition, and the organic solvent (B) works to dissolve the siloxane resin (A) uniformly. A resin solution prepared by dissolving the siloxane resin (A) in the organic solvent (B) serves to allowing a transparent coat film having a small cure shrinkage and achieving strong adhesion to organic films and inorganic films to be formed easily on a glass substrate, but unevenness tends to result from solvent volatilization during drying of the coat film. According to the present invention, however, the addition of the aforementioned specific surfactants in specific quantities serves to eliminate coating defects (such as pin hole) and unevenness attributed to a film thickness variation around Benard cells or glass substrate edges during drying of the coat film to permit the formation of a transparent coat film having a good appearance even when such a technique as spray coating and ink jet coating is used to apply the transparent resin composition on the glass substrate. Here, the transparent resin composition according to the present invention should be one that can give a 1.5 µm thick resin coat film having a transmittance of 80% or more when measured at a wavelength of 400 nm using a spectrophotometer.

The silicon modified acrylic surfactant (C1) can work to decrease the surface tension while depressing the increase in the contact angle of the transparent resin composition on the glass substrate. Accordingly, the incorporation of the silicon modified acrylic surfactant (C1) serves to allow discharged droplets to spread while wetting the glass substrate to prevent the occurrence of coating defects such as pin hole even when such a technique as spray coating and ink jet coating is used to apply the transparent resin composition on the glass substrate. However, when the resin composition contains a siloxane resin, the silicon modified acrylic surfactant will decline in the surface tension reducing effect, leading to the troublesome occurrence of unevenness due to Benard cells etc. during drying of the coat film. Compared to this, the addition of a silicon based surfactant or fluorochemical surfactant acts to reduce the surface tension of the transparent resin composition, serving to suppress the occurrence of unevenness during drying of the coat film. However, this increases the contact angle of the transparent resin composition on the glass substrate, leading easily to the troublesome occurrence of pin hole when such a technique as spraying and ink jet is used to apply the transparent resin composition on the glass substrate. When a silicon based surfactant or a fluorochemical surfactant is contained, furthermore, the transparent coat film formed will be low in surface free energy and accordingly, an organic film or an inorganic film formed on the transparent coat film will tend to fail to achieve strong adhesion. Thus, as a result of intensive studies to seek out surfactants that can eliminate coating defects that can occur during coating of a glass substrate with a transparent resin composition by such a technique as spray coating and ink jet coating and drying defects that can occur during drying of the coat film, while maintaining the adhesion of the transparent coat film, the inventors found that the problem can be solved by using a combination of a silicon modified acrylic surfactant (C1) and a fluorine-containing heat-decomposable surfactant (C2). Specifically, it was found that the incorporation of the silicon modified acrylic surfactant (C1) works to suppress the occurrence of coating defects such as pin hole while the incorporation of the fluorine-containing heat-decomposable surfactant (C2) acts to decrease the surface tension while suppressing the increase in the contact angle on the glass substrate, thus serving to eliminate unevenness during drying of the coat film and that the fluorine-containing heat-decomposable surfactant (C2) is heat-decomposed during heat-curing of the transparent resin composition to achieve improved adhesion between the transparent coat film and an inorganic film or organic film.

Preferred examples of the silicon modified acrylic surfactant (C1) include compounds having structures as represented by the general formula (1) given below:

[Chemical formula 1]

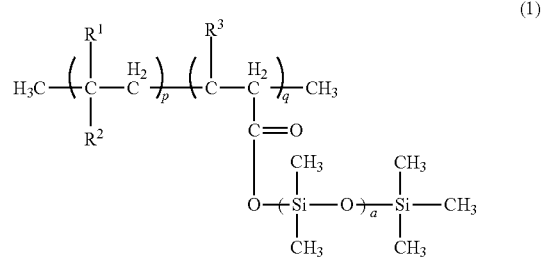

In the general formula (1) given above, $R^1$ to $R^3$ are each a hydrogen atom or a methyl group; a is an integer of 1 to 18; p is an integer of 0 to 50; and q is an integer of 1 to 8. Here, a is preferably an integer of 2 to 18. The p repeating units and the q repeating units may have either a block structure or a random structure.

The silicon modified acrylic surfactant (C1) may be a commercially available product, and compounds having structures as represented by the general formula (1) given above include, for example, BYK-3550 and BYK-SILX-LEAN 3700 (both manufactured by BYK-Chemie). Two or more of these may be contained together.

The fluorine-containing heat-decomposable surfactant (C2) is a fluorine-containing surfactant that is heat-decomposable. Here, heat decomposability means the ability to heat-decompose when exposed to an environment in the temperature range of 150° C. to 300° C. for 30 minutes.

For example, if a fluorine-containing heat-decomposable surfactant (C2) having a carboxyl group is exposed to an environment in the range of 150° C. to 300° C. for 30 minutes, the structure blocking the carboxyl group will be detached to release the carboxyl group. An example of the fluorine-containing heat-decomposable surfactant (C2) is a compound having a backbone chain of a polymer structure incorporating polymerizable monomers, a side chain having a fluorinated alkyl group and/or a poly(perfluoroalkylene ether) chain, and a side chain having a structure as represented by the general formula (2) given below:

[Chemical formula 2]

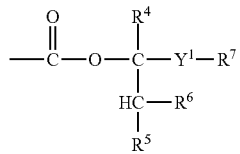

(2)

In the general formula (2) given above, $R^4$, $R^5$, and $R^6$ are each independently a hydrogen atom or a monovalent organic group having 1 to 18 carbon atoms; $R^7$ is a monovalent organic group containing 1 to 18 carbon atoms. $R^6$ and $R^7$ may be bonded to each other to form a heterocyclic ring in which $Y^1$ is the hetero atom. $Y^1$ is an oxygen atom or a sulfur atom; The monovalent organic group having 1 to 18 carbon atoms is preferably an alkyl group or a cycloalkyl group. $R^4$, $R^5$, and $R^6$ are each preferably a hydrogen atom, and $R^7$ is preferably an alkyl group having 1 to 18 carbon atoms or a cycloalkyl group having 1 to 18 carbon atoms.

Examples of the polymerizable monomer contained in the backbone chain of the fluorine-containing heat-decomposable surfactant (C2) include those polymerizable monomers as represented by the general formula (3) given below and those polymerizable monomers having carboxyl groups. In the fluorine-containing heat-decomposable surfactant (C2), Rf in the general formula (3) given below forms the aforementioned side chain containing a fluorinated alkyl group and/or a poly(perfluoroalkylene ether) chain:

[Chemical formula 3]

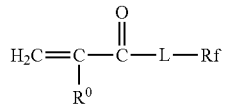

(3)

In the general formula (3), $R^0$ is a hydrogen atom or a methyl group; L is a polyether, polyurethane, or polyol, all having 1 to 18 carbon atoms; and Rf is a fluorinated alkyl group having 1 to 18 carbon atoms or a poly(perfluoroalkylene ether) chain having 1 to 18 carbon atoms. From the viewpoint of further suppressing unevenness that can occur during application of the transparent resin composition, Rf is preferably a fluorinated alkyl group having 1 to 6 carbon atoms to which a fluorine atom is bonded directly.

The fluorine-containing heat-decomposable surfactant (C2) may be a commercially available product, and examples of the compound having a backbone chain of a polymer structure incorporating polymerizable monomers, a side chain having a fluorinated alkyl group and/or a poly(perfluoroalkylene ether) chain, and a side chain having a structure as represented by the general formula (2) given above include DS-21 (manufactured by DIC Corporation).

The fluorine-containing heat-decomposable surfactant (C2) can be produced by, for example, polymerizing a polymerizable monomer having a fluorinated alkyl group and/or a poly(perfluoroalkylene ether) chain and a polymerizable monomer having a carboxyl group, and heating the resulting polymer with a vinyl ether compound in the presence of an acid catalyst at about 20° C. to 100° C. so that the compound is connected to the carboxyl group to form a block structure. For example, the method described in Unexamined Patent Publication (Kokai) No. 2016-17172 may be useful.

For the transparent resin composition according to the present invention, the total content of the silicon modified acrylic surfactant (C1) and the fluorine-containing heat-decomposable surfactant (C2) is 50 ppm or more and 500 ppm or less in the transparent resin composition. If the total content is less than 50 ppm, the surface tension of the transparent resin composition will increase and unevenness due to Benard cells etc. will be generated easily during drying of the coat film. If the total content is more than 500 ppm, on the other hand, the surface tension of the coating liquid will be too small, leading to drying unevenness and thinning of the transparent coat film along the edge of the glass substrate. The total content is preferably 400 ppm or less.

For the colored resin composition according to the present invention, the content of the silicon modified acrylic surfactant (C1) is preferably 25 ppm or more and 300 ppm or less in the transparent resin composition and in that case, the contact angle can be controlled easily in the preferable range described later. The content of the silicon modified acrylic surfactant (C1) is more preferably 25 ppm or more and 150 ppm or less.

For the colored resin composition according to the present invention, the content of the fluorine-containing heat-decomposable surfactant (C2) is preferably 25 ppm or more and 300 ppm or less in the transparent resin composition and in that case, the surface tension can be controlled easily in the preferable range described later. The content of the fluorine-containing heat-decomposable surfactant (C2) is more preferably 25 ppm or more and 150 ppm or less.

The ratio of the content of the fluorine-containing heat-decomposable surfactant (C2) to the content of the silicon modified acrylic surfactant (C1), namely, the content ratio (C2)/(C1), is preferably 0.25 or more, more preferably 0.50 or more, from the viewpoint of further suppressing the unevenness during drying of the coat film. From the viewpoint of further suppressing the unevenness along the edge of the glass substrate, on the other hand, (C2)/(C1) is preferably 4.0 or less, more preferably 2.0 or less.

The siloxane resin (A) is a polymer containing a repeating unit having a siloxane backbone. It is preferably a hydrolysis condensation product of an organosilane compound having a structure as represented by the general formula (4) given below:

[Chemical formula 4]

$$X^1_n SiX^2_{4-n} \quad (4)$$

In general formula (4), $X^1$ is a hydrogen atom, a fluorine atom, a monovalent organic group having 1 to 20 carbon atoms, or a group containing a B atom, N atom, Al atom, P atom, Si atom, Ge atom, or Ti atom; $X^2$ is a hydrolysable group; n is an integer of 0 to 2; when n is 2, the $X^1$ groups may be identical to or different from each other; and when n is 0 to 2, the $X^2$ groups may be identical to or different from each other.

Examples of the hydrolysable group $X^2$ include alkoxy groups, halogen groups, acetoxy groups, isocyanate groups, and hydroxyl groups. Of these, the use of an alkoxy group is preferable from the viewpoint of liquid stability and coatability of the transparent resin composition.

The siloxane resin (A) preferably has a radical polymerizable group and more preferably has a radical polymerizable group and a carboxyl group and/or a dicarboxylic anhydride group. The incorporation of a radical polymerizable group serves to strengthen the glass substrate, and its photosensitivity permits easy pattern processing of the transparent coat film. Furthermore, the incorporation of a carboxyl group and/or a dicarboxylic anhydride group serves to improve the solubility during pattern processing of the transparent coat film, permitting the formation of a finer pattern. Here, the siloxane resin (A) having a radical polymerizable group or a carboxyl group can be produced by using an organosilane compound having these groups as the organosilane compound to be subjected to hydrolysis condensation.

Examples of the radical polymerizable group include vinyl group, α-methylvinyl group, allyl group, styryl group, and (meth)acryloyl group. The use of a (meth)acryloyl group is preferable from the viewpoint of increasing the hardness of the transparent coat film and the sensitivity in the pattern processing step. On the other hand, the incorporation of a photoacid generator as a photosensitive agent in addition to a siloxane resin having an alkali soluble group serves to relatively increase the alkali solubility of the exposed portions to develop positive type photosensitivity.

Examples of the organosilane compound having a radical polymerizable group include vinyl trimethoxysilane, vinyl triethoxysilane, vinyl tri(methoxyethoxy) silane, vinylmethyl dimethoxysilane, vinylmethyl diethoxysilane, vinylmethyl di(methoxyethoxy) silane, allyl trimethoxysilane, allyl triethoxysilane, allyl tri(methoxyethoxy) silane, allylmethyl dimethoxysilane, allylmethyl diethoxysilane, allylmethyl di(methoxyethoxy) silane, styryl trimethoxysilane, styryl triethoxysilane, styryl tri(methoxyethoxy) silane, styrylmethyl dimethoxysilane, styrylmethyl diethoxy silane, styrylmethyl di(methoxyethoxy) silane, γ-acryloylpropyl trimethoxysilane, γ-acryloylpropyl triethoxysilane, γ-acryloylpropyl tri(methoxyethoxy)silane, γ-methacryloylpropyl trimethoxysilane, γ-methacryloylpropyl triethoxysilane, γ-methacryloylpropyl tri(methoxyethoxy) silane, γ-methacryloylpropylmethyl dimethoxysilane, γ-methacryloylpropylmethyl diethoxysilane, γ-acryloylpropylmethyl dimethoxysilane, γ-acryloylpropylmethyl diethoxysilane, γ-methacryloylpropyl (methoxyethoxy) silane. Two or more of these may be used in combination. Of these, those preferred from the viewpoint of further increasing the hardness of the resulting cured film and the sensitivity in the pattern processing step include γ-acryloylpropyl trimethoxysilane, γ-acryloylpropyl triethoxysilane, γ-methacryloylpropyl trimethoxysilane, and γ-methacryloylpropyl triethoxysilane.

Examples of the organosilane compound having a carboxyl group include urea group-containing organosilane compounds as represented by the general formula (5) given below, urethane group-containing organosilane compounds as represented by the general formula (6) given below, and organosilane compounds as represented by the general formula (10) described later. Two or more of these may be used in combination.

[Chemical formula 5]

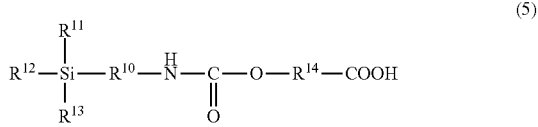

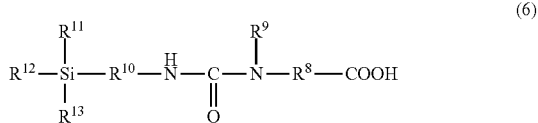

In the general formulae (5) and (6) given above, $R^8$, $R^{10}$, and $R^{14}$ are each a divalent organic group containing 1 to 20 carbon atoms; $R^9$ is a hydrogen atom or an alkyl group containing 1 to 3 carbon atoms; $R^{11}$ to $R^{13}$ are each an alkyl group containing 1 to 6 carbon atoms, an alkoxy group containing 1 to 6 carbon atoms, a phenyl group, a phenoxy group, an alkylcarbonyloxy group containing 2 to 6 carbon atoms, or a substitution product thereof. Here, at least one of $R^{11}$ to $R^{13}$ is an alkoxy group, a phenoxy group, or an acetoxy group.

Preferred examples of $R^8$ and $R^{14}$ in general formulae (5) and (6) include hydrocarbon groups such as methylene group, ethylene group, n-propylene group, n-butylene group, phenylene group, —$CH_2$—$C_6H_4$—$CH_2$—, and —$CH_2$—$C_6H_4$—. Of these, the use of a hydrocarbon group having an aromatic ring such as phenylene group, —$CH_2$—$C_6H_4$—$CH_2$—, and —$CH_2$—$C_6H_4$— is preferred from the viewpoint of heat resistance.

In the general formula (6) given above, $R^9$ is preferably a hydrogen atom or a methyl group from the viewpoint of reactivity.

Examples of $R^{10}$ in the general formulae (5) and (6) given above include hydrocarbon groups such as methylene group, ethylene group, n-propylene group, n-butylene group, n-pentylene group, and others such as oxymethylene group, oxyethylene group, oxy-n-propylene group, oxy-n-butylene group, and oxy-n-pentylene group. Of these, the methylene group, ethylene group, n-propylene group, n-butylene group, oxymethylene group, oxyethylene group, oxy-n-propylene group, and oxy-n-butylene group are preferred from the viewpoint of easy synthesis.

Specific examples of alkyl groups that serve as $R^{11}$ to $R^{13}$ in the general formulae (5) and (6) given above include the methyl group, ethyl group, n-propyl group, and isopropyl group. The methyl group and ethyl group are preferred from the viewpoint of easy synthesis. Specific examples of alkoxy groups include the methoxy group, ethoxy group, n-propoxy group, and isopropoxy group. The methoxy group and ethoxy group are preferred from the viewpoint of easy synthesis. Examples of the substituent groups in the substitution products include the methoxy group and ethoxy group. More specifically, they include 1-methoxypropyl group and methoxyethoxy group.

A urea group-containing organosilane compound as represented by the general formula (5) given above can be produced from an aminocarboxylic acid compound as represented by the general formula (7) given below and an isocyanate group-containing organosilane compound as represented by the general formula (9) given below through a generally known urea formation reaction. Furthermore, a urethane group-containing organosilane compound as represented by the general formula (6) given above can be produced from a hydroxycarboxylic acid compound as represented by the general formula (8) given below and an isocyanate group-containing organosilane compound as represented by the general formula (9) given below through a generally known urethane formation reaction.

[Chemical formula 6]

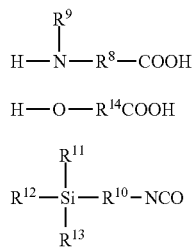

(7)
(8)
(9)

In the general formulae (7) and (9) given above, $R^8$, $R^{10}$, and $R^{14}$ are each a divalent organic group containing 1 to 20 carbon atoms; $R^9$ is a hydrogen atom or an alkyl group containing 1 to 3 carbon atoms. $R^{11}$ to $R^{13}$ are each an alkyl group containing 1 to 6 carbon atoms, an alkoxy group containing 1 to 6 carbon atoms, a phenyl group, a phenoxy group, an alkylcarbonyloxy group containing 2 to 6 carbon atoms, or a substitution product thereof. Here, at least one of $R^7$ to $R^9$ is an alkoxy group, a phenoxy group, or an acetoxy group. Preferred examples of $R^8$ to $R^{14}$ are as described above for $R^8$ to $R^{14}$ in general formulae (5) and (6).

[Chemical formula 7]

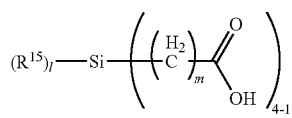

(10)

In the general formula (10) given above, $R^{15}$ is an alkyl group containing 1 to 6 carbon atoms, an alkoxy group containing 1 to 6 carbon atoms, a phenyl group, a phenoxy group, an alkylcarbonyloxy group containing 2 to 6 carbon atoms, or a substitution product thereof. When l is 2 or more, the plurality of $R^{15}$ groups may be identical to or different from each other, but at least one of them is an alkoxy group, a phenoxy group, or an acetoxy group. Here, l is an integer of 1 to 3, and m is an integer of 2 to 20.

Examples of the organosilane compound having a dicarboxylic anhydride group include those organosilane compounds as represented by any one of the general formulae (11) to (13) given below. Two or more of these may be used in combination.

[Chemical formula 8]

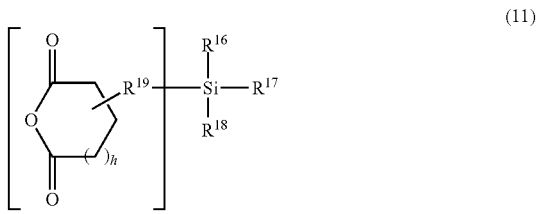

(11)

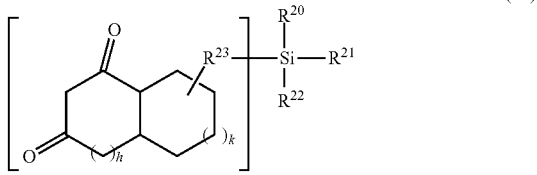

(12)

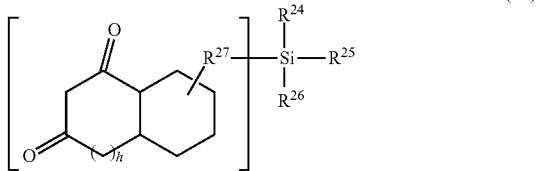

(13)

In the formulae given above, $R^{16}$ to $R^{18}$, $R^{20}$ to $R^{22}$, and $R^{24}$ to $R^{26}$ are each an alkyl group containing 1 to 6 carbon atoms, an alkoxy group containing 1 to 6 carbon atoms, a phenyl group, a phenoxy group, an alkylcarbonyloxy group containing 2 to 6 carbon atoms, or a substitution product thereof. $R^{19}$, $R^{23}$, and $R^{27}$ are each a single bond, linear aliphatic hydrocarbon group, cyclic aliphatic hydrocarbon group, carbonyl group, ether group, ester group, amide group, aromatic group, or a divalent group containing any thereof. These groups may be substituted. Furthermore, h and k are each an integer of 0 to 3.

Specific examples of $R^{19}$, $R^{23}$, and $R^{27}$ include —$C_2H_4$—, —$C_3H_6$—, —$C_4H_8$—, —O—, —$C_3H_6OCH_2CH(OH)CH_2O_2C$—, —CO—, —$CO_2$—, —CONH—, and organic groups given below:

[Chemical formula 9]

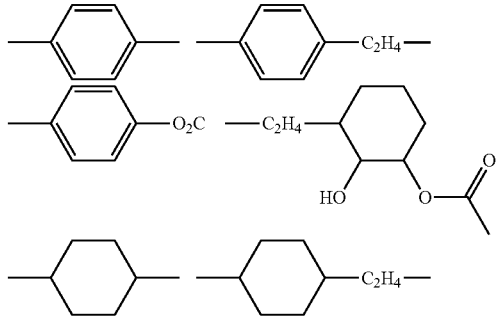

Specific examples of the organosilane compounds represented by the general formula (11) given above include 3-trimethoxysilyl propylsuccinic anhydride, 3-triethoxysilyl propylsuccinic anhydride, and 3-triphenoxysilyl propylsuccinic anhydride. Specific examples of the organosilane compounds represented by the general formula (12) given above include 3-trimethoxysilyl propylcyclohexyldicarboxylic anhydride. Specific examples of the organosilane compounds represented by the general formula (13) given above include 3-trimethoxysilyl propylphthalic anhydride.

The siloxane resin (A) may be a hydrolysis condensation product of an organosilane having a radical polymerizable group and a carboxyl group as described above and another organosilane. Examples of such another organosilane compound include methyl trimethoxysilane, methyl triethoxysilane, methyl tri(methoxyethoxy)silane, methyl tripropoxysilane, methyl triisopropoxysilane, methyl tributoxysilane, ethyl trimethoxysilane, ethyl triethoxysilane, hexyl trimethoxysilane, octadecyl trimethoxysilane, octadecyl triethoxysilane, 3-aminopropyl triethoxysilane, N-(2-aminoethyl)-3-aminopropyl trimethoxysilane, 3-chloropropyl trimethoxysilane, 3-(N, N-diglycidyl)aminopropyl trimethoxysilane, 3-glycidoxypropyl trimethoxysilane, γ-aminopropyl trimethoxysilane, γ-aminopropyl triethoxysilane, N-β-(aminoethyl)-γ-aminopropyl trimethoxysilane, β-cyanoethyl triethoxysilane, glycidoxymethyl trimethoxysilane, glycidoxymethyl triethoxysilane, α-glycidoxyethyl trimethoxysilane, α-glycidoxyethyl triethoxysilane, β-glycidoxyethyl trimethoxysilane, β-glycidoxyethyl triethoxysilane, α-glycidoxypropyl trimethoxysilane, α-glycidoxypropyl triethoxysilane, β-glycidoxypropyl trimethoxysilane, β-glycidoxypropyl triethoxysilane, γ-glycidoxypropyl trimethoxysilane, γ-glycidoxypropyl triethoxysilane, γ-glycidoxypropyl tripropoxysilane, γ-glycidoxypropyl triisopropoxysilane, γ-glycidoxypropyl tributoxysilane, γ-glycidoxypropyl tri(methoxyethoxy)silane, α-glycidoxybutyl trimethoxysilane, α-glycidoxybutyl triethoxysilane, β-glycidoxybutyl trimethoxysilane, β-glycidoxybutyl triethoxysilane, γ-glycidoxybutyl trimethoxysilane, γ-glycidoxybutyl triethoxysilane, δ-glycidoxybutyl trimethoxysilane, δ-glycidoxybutyl triethoxysilane, (3,4-epoxycyclohexyl)methyl trimethoxysilane, (3,4-epoxycyclohexyl)methyl triethoxysilane, 2-(3,4-epoxycyclohexyl)ethyl tripropoxysilane, 2-(3,4-epoxycyclohexyl)ethyl tributoxysilane, 2-(3,4-epoxycyclohexyl)ethyl trimethoxysilane, 2-(3,4-epoxycyclohexyl)ethyl triethoxysilane, 2-(3,4-epoxycyclohexyl)ethyl triphenoxysilane, 3-(3,4-epoxycyclohexyl)propyl trimethoxysilane, 3-(3,4-epoxycyclohexyl)propyl triethoxysilane, 4-(3,4-epoxycyclohexyl)butyl trimethoxysilane, 4-(3,4-epoxycyclohexyl)butyl triethoxysilane, dimethyl dimethoxysilane, dimethyl diethoxysilane, γ-glycidoxypropylmethyl dimethoxysilane, γ-aminopropylmethyl dimethoxysilane, γ-aminopropylmethyl diethoxysilane, N-(2-aminoethyl)-3-aminopropylmethyl dimethoxysilane, glycidoxymethyl dimethoxysilane, glycidoxymethylmethyl diethoxysilane, α-glycidoxyethylmethyl dimethoxysilane, α-glycidoxyethylmethyl diethoxysilane, β-g lycidoxyethylmethyl dimethoxysilane, β-glycidoxyethylmethyl diethoxysilane, α-glycidoxypropylmethyl dimethoxysilane, α-glycidoxypropylmethyl diethoxysilane, glycidoxypropylmethyl dimethoxysilane, β-glycidoxypropylmethyl diethoxysilane, γ-glycidoxypropylmethyl dimethoxysilane, γ-glycidoxypropylmethyl diethoxysilane, γ-glycidoxypropylmethyl dipropoxysilane, β-glycidoxypropylmethyl dibutoxysilane, γ-glycidoxypropylmethyl di(methoxyethoxy)silane, γ-glycidoxypropylethyl dimethoxysilane, γ-glycidoxypropylethyl diethoxysilane, 3-chloropropylmethyl dimethoxysilane, 3-chloropropylmethyl diethoxysilane, cyclohexylmethyl dimethoxysilane, octadecylmethyl dimethoxysilane, tetramethoxysilane, tetraethoxysilane, trifluoromethyl trimethoxysilane, trifluoromethyl triethoxysilane, trifluoropropyl trimethoxysilane, trifluoropropyl triethoxysilane, perfluoropropyl trimethoxysilane, perfluoropropyl triethoxysilane, perfluoropentyl trimethoxysilane, perfluoropentyl triethoxysilane, tridecafluorooctyl trimethoxysilane, tridecafluorooctyl triethoxysilane, tridecafluorooctyl tripropoxysilane, tridecafluorooctyl triisopropoxysilane, heptadecafluorodecyl trimethoxysilane, heptadecafluorodecyl triethoxysilane, bis(trifluoromethyl) dimethoxysilane, bis(trifluoropropyl) dimethoxysilane, bis(trifluoropropyl) diethoxysilane, trifluoropropylmethyl dimethoxysilane, trifluoropropylmethyl diethoxysilane, trifluoropropylethyl dimethoxysilane, trifluoropropylethyl diethoxysilane, and heptadecafluorodecylmethyl dimethoxysilane. Two or more of these may be used in combination. Of these, trifluoropropyl trimethoxysilane, trifluoropropyl triethoxysilane, tridecafluorooctyl trimethoxysilane, and tridecafluorooctyl triethoxysilane are preferred. Two or more of these may be used in combination.

The siloxane resin (A) can be produced by hydrolysis condensation of an organosilane compound. For example, it can be produced by hydrolyzing an organosilane compound and subjecting the resulting silanol compound to a condensation reaction in the presence of the organic solvent (B) or under solvent-free conditions.

The conditions for the hydrolysis reaction may be set up appropriately taking into consideration the reaction scale, the size and shape of the reaction container, etc. For example, a preferred procedure is adding an acid catalyst and water to an organosilane compound in a solvent over 1 to 180 minutes and then allowing them to react for 1 to 180 minutes in the temperature range from room temperature to 110° C. These conditions for hydrolysis reaction can prevent the reaction from proceeding too rapidly. The reaction temperature is more preferably 30° C. to 105° C.

It is preferable that the hydrolysis reaction takes place in the presence of an acid catalyst. Preferred acid catalysts include acidic aqueous solutions containing formic acid, acetic acid, or phosphoric acid. The content of the acid catalyst is preferably 0.1 to 5 parts by weight relative to the total amount, which represents 100 parts by weight, of the organosilane compound used for the hydrolysis reaction. Adjusting the content of the acid catalyst in the above range allows the hydrolysis reaction to proceed more efficiently.

It is preferable that the production of a silanol compound by hydrolysis reaction of an organosilane compound is followed by subjecting the resulting reaction liquid directly to condensation reaction by heating at a temperature of not lower than 50° C. and not higher than the boiling point of the solvent for 1 to 100 hours. In addition, the liquid may be heated again or a basic catalyst may be added in order to increase the polymerization degree of the polysiloxane.

Useful organic solvents for the hydrolysis reaction of an organosilane compound or the condensation reaction of a silanol compound include, for example, alcohols such as methanol, ethanol, propanol, isopropanol, butanol, isobutanol, t-butanol, pentanol, 4-methyl-2-pentanol, 3-methyl-2-butanol, 3-methyl-3-methoxy-1-butanol, 1-t-butoxy-2-propanol, and diacetone alcohol; glycols such as ethylene glycol and propylene glycol; ethers such as ethylene glycol monomethyl ether, ethylene glycol monoethyl ether, propylene glycol monomethyl ether, propylene glycol monoethyl ether, propylene glycol monopropyl ether, propylene glycol monobutyl ether, ethylene glycol dimethyl ether, ethylene glycol diethyl ether, ethylene glycol dibutyl ether, and diethyl ether; ketones such as methyl ethyl ketone, acetylacetone, methyl propyl ketone, methyl butyl ketone, methyl isobutyl ketone, diisobutyl ketone, cyclopentanone, and 2-heptanone; amides such as dimethyl formamide and dimethyl acetamide; acetates such as ethyl acetate, propyl acetate, butyl acetate, isobutyl acetate, ethylene glycol monoethyl ether acetate, propylene glycol monomethyl ether acetate, 3-methoxybutyl acetate, 3-methyl-3-methoxybutyl acetate, methyl lactate, ethyl lactate, and butyl lactate; aromatic or aliphatic hydrocarbons such as toluene, xylene, hexane, and cyclohexane; and others such as γ-butyrolactone, N-methyl-2-pyrrolidone, and dimethyl sulfoxide. From the viewpoint of the transmittance and crack resistance of the resulting cured films, preferred ones include diacetone alcohol, propylene glycol monomethyl ether, propylene glycol monomethyl ether acetate, propylene glycol monoethyl ether, propylene glycol mono-t-butyl ether, propylene glycol monopropyl ether, propylene glycol monobutyl ether, and γ-butyrolactone.

A solvent-free hydrolysis technique may be adopted in the case where a solvent is generated from the hydrolysis reaction. It is also preferable that a solvent is added further after the end of the reaction to adjust the resin composition to an appropriate concentration. To suit particular purposes, furthermore, an appropriate amount of the resulting alcohol may be distilled out and removed by heating and/or reducing the pressure after the hydrolysis reaction, followed by adding an appropriate solvent.

The solvent used for the hydrolysis reaction preferably accounts for 80 parts by weight or more and 500 parts by weight or less relative to the total amount, which represents 100 parts by weight, of the organosilane compound. Adjusting the content of the solvent in the above range allows the hydrolysis reaction to proceed more efficiently.

The water used for the hydrolysis reaction is preferably ion-exchanged water. The water preferably accounts for 1.0 to 4.0 moles relative to 1 mole of the silane atom.

Examples of the organic solvent (B) include aliphatic hydrocarbons, carboxylates, ketones, ethers, and alcohols. Two or more of these may be contained together. From the viewpoint of uniform dissolution of all components to permit the formation of a coat film with improved transparency, it is preferable to use a compound having an alcoholic hydroxyl group or a cyclic compound having a carbonyl group.

Examples of the compound having an alcoholic hydroxyl group include acetol, 3-hydroxy-3-methyl-2-butanone, 4-hydroxy-3-methyl-2-butanone, 5-hydroxy-2-pentanone, 4-hydroxy-4-methyl-2-pentanone (diacetone alcohol), ethyl lactate, butyl lactate, propylene glycol monomethyl ether, propylene glycol monoethyl ether, propylene glycol mono-n-propyl ether, propylene glycol mono-n-butyl ether, propylene glycol mono-t-butyl ether, 3-methoxy-1-butanol, and 3-methyl-3-methoxy-1-butanol. Of these, diacetone alcohol and 3-methyl-3-methoxy-1-butanol are preferred from the viewpoint of storage stability.

Specific examples of the cyclic compound having a carbonyl group include γ-butyrolactone, γ-valerolactone, δ-valerolactone, propylene carbonate, N-methyl pyrrolidone, cyclohexanone, and cycloheptanone. Of these, γ-butyrolactone is preferred.

Examples of the aliphatic hydrocarbons include xylene, ethyl benzene, and solvent naphtha.

Examples of the carboxylates include benzyl acetate, ethyl benzoate, γ-butyrolactone, methyl benzoate, diethyl malonate, 2-ethylhexyl acetate, 2-butoxyethyl acetate, 3-methoxy-3-methyl-butyl acetate, diethyl oxalate, ethyl acetoacetate, cyclohexyl acetate, 3-methoxy-butyl acetate, methyl acetoacetate, ethyl-3-ethoxy propionate, 2-ethylbutyl acetate, isopentyl propionate, propylene glycol monomethyl ether propionate, propylene glycol monoethyl ether acetate, ethyl acetate, butyl acetate, isopentyl acetate, pentyl acetate, and propylene glycol monomethyl ether acetate.

Examples of the ketones include cyclopentanone and cyclohexanone.

Examples of the ethers include aliphatic ethers of propylene glycol derivatives such as propylene glycol monomethyl ether, propylene glycol monoethyl ether, propylene glycol tertiary butyl ether, and dipropylene glycol monomethyl ether.

From the viewpoint of ensuring improved coatability by appropriately controlling the volatility and drying characteristics during the coating of the glass substrate by spray coating or ink jet coating, it is preferable to include an organic solvent having a boiling point of 150° C. or more and 250° C. or less under atmospheric pressure and an organic solvent having a boiling point of less than 150° C. under atmospheric pressure. From the viewpoint of suppressing the solidification of the siloxane resin (A) attributed to the drying of the coating liquid at the nozzle, it is preferable that an organic solvent having a boiling point of 150° C. or more and 250° C. or less under atmospheric pressure accounts for 10 parts by mass or more relative to the total quantity, which represents 100 parts by mass, of the organic solvent (B). From the viewpoint of suppressing the dropping of the coating liquid along the curved glass surface to ensure uniform film thickness, it is preferable that the organic solvent having a boiling point of 150° C. or more and 250° C. or less under atmospheric pressure accounts for 75 parts by mass or less relative to the total quantity, which represents 100 parts by mass, of the organic solvent (B). It is more preferable for the organic solvent having a boiling point of 150° C. or more and 250° C. or less under atmospheric pressure to have a boiling point of 150° C. or more and 200° C. or less.

Examples of the organic solvent having a boiling point of 150° C. or more and 250° C. or less under atmospheric pressure include 4-hydroxy-4-methyl-2-pentanone (diacetone alcohol), ethyl lactate, butyl lactate, propylene glycol mono-t-butyl ether, 3-methoxy-1-butanol, 3-methyl-3-methoxy-1-butanol, benzyl acetate, ethyl benzoate, methyl benzoate, diethyl malonate, 2-ethylhexyl acetate, 2-butoxyethyl acetate, 3-methoxy-3-methyl-butyl acetate, diethyl oxalate, acetoethyl acetate, cyclohexyl acetate, 3-methoxybutyl acetate, acetomethyl acetate, ethyl-3-ethoxypropionate, isopentyl propionate, propylene glycol monomethyl ether propionate, γ-butyrolactone, γ-valerolactone, δ-valerolactone, propylene carbonate, N-methyl pyrrolidone, cyclohexanone, and cycloheptanone. Of these, 4-hydroxy-4-methyl-2-pentanone (diacetone alcohol), 3-methyl-3-methoxy-1-butanol, 3-methoxy-3-methyl-butyl acetate, 3-methoxy-butyl acetate, and γ-butyrolactone are particularly preferred.

Examples of the organic solvent having a boiling point of less than 150° C. under atmospheric pressure include methyl acetate, ethyl acetate, isopropyl acetate, n-propyl acetate, butyl acetate, ethylene glycol monomethyl ether acetate, propylene glycol monomethyl ether acetate, propylene glycol monomethyl ether, propylene glycol monoethyl ether, ethylene glycol ethyl ether, ethylene glycol methyl ether, butanol, isobutanol, n-propyl alcohol, and ethyl acetate. Of these, propylene glycol monomethyl ether acetate and propylene glycol monomethyl ether are particularly preferred.

The transparent resin composition according to the present invention preferably has photosensitivity because the coat film can be cured by photocuring in combination with heat curing to provide a transparent coat film with decreased stress, thereby leading to improved adhesion to the glass substrate. It is preferable to further add a reactive monomer and a photo-radical polymerization initiator in order to allow the transparent resin composition to have negative photosensitivity.

Examples of the reactive monomer include monofunctional or polyfunctional acrylic monomers and acrylic oligomers. Two or more of these may be contained together. Among others, the use of a polyfunctional (meth)acrylate is preferred.

Examples of the polyfunctional (meth)acrylate include 2,2-[9H-fluorene-9,9-diylbis(1,4-phenylene) bisoxy]diethanol di(meth)acrylate (hereinafter MM-1), ethylene glycol di(meth)acrylate, diethylene glycol di(meth)acrylate, trimethylolpropane tri(meth)acrylate, dimethylol tricyclodecane di(meth)acrylate, ethoxylated bisphenol A di(meth)acrylate, glycerin di(meth)acrylate, tripropylene glycol di(meth)acrylate, 1,3-butanediol di(meth)acrylate, neopentyl glycol di(meth)acrylate, 1,4-butanediol di(meth)acrylate, 1,6-hexanediol di(meth)acrylate, 1,9-nonanediol di(meth)acrylate, 1,10-decanediol di(meth)acrylate, glycerin tri(meth)acrylate, pentaerythritol tri(meth)acrylate, pentaerythritol tetra(meth)acrylate, pentaerythritol tri(meth)acrylate, pentaerythritol tetra(meth)acrylate, ethoxylated pentaerythritol tetra(meth)acrylate, dipentaerythritol hexa(meth)acrylate, tripentaerythritol hepta(meth)acrylate, tripentaerythritol octa(meth)acrylate, tetrapentaerythritol nona(meth)acrylate, tetrapentaerythritol deca(meth)acrylate, pentapentaerythritol undeca(meth)acrylate, and pentapentaerythritol dodeca(meth)acrylate.

In the transparent resin composition according to the present invention, the reactive monomer preferably accounts for 10 to 90 parts by mass relative to the total quantity, which accounts for 100 parts by mass, of the siloxane resin (A) and the reactive monomer.

Examples of the photo-radical polymerization initiator include inorganic photo-radical polymerization initiators such as alkyl phenone based photo-radical polymerization initiators, acyl phosphine oxide based photo-radical polymerization initiators, oxime ester based photo-radical polymerization initiators, benzophenone based photo-radical polymerization initiators, oxanthone based photo-radical polymerization initiators, imidazole based photo-radical polymerization initiators, benzothiazole based photo-radical polymerization initiators, benzoxazole based photo-radical polymerization initiators, carbazole based photo-radical polymerization initiators, triazine based photo-radical polymerization initiators, benzoic acid ester based photo-radical polymerization initiators, phosphorous photo-radical polymerization initiators, and titanates. Two or more of these may be contained together.

Examples of the alkyl phenone based photo-radical polymerization initiators include α-aminoalkyl phenone based photo-radical polymerization initiators and α-hydroxyalkyl phenone based photo-radical polymerization initiators. Of these, α-aminoalkyl phenone based photo-radical polymerization initiators, acyl phosphine oxide based photo-radical polymerization initiators, oxime ester based photo-radical polymerization initiators, amino group-containing benzophenone based photo-radical polymerization initiators, and amino group-containing benzoic acid ester based photo-radical polymerization initiators are preferred from the viewpoint of providing a transparent coat film with higher hardness. These compounds can participate not only in the crosslinking reaction of the radical polymerizable group but also in the crosslinking of the siloxane resin (A) by acting as a base or an acid in the light exposure step or in the heat curing step, thereby serving to further increase the hardness of the transparent coat film.

Examples of the α-aminoalkyl phenone based photo-radical polymerization initiators include 2-methyl-[4-(methylthio)phenyl]-2-morpholinopropane-1-one, 2-dimethylamino-2-(4-methylbenzyl)-1-(4-morpholine-4-yl-phenyl)-butane-1-one, and 2-benzyl-2-dimethylamino-1-(4-morpholinophenyl)-butanone-1. Examples of acyl phosphine oxide based photo-radical polymerization initiators include 2,4,6-trimethylbenzoylphenyl phosphine oxide, bis(2,4,6-trimethylbenzoyl)-phenyl phosphine oxide, and bis(2,6-dimethoxybenzoyl)-(2,4,4-trimethylpentyl)-phosphineoxide. Examples of the oxime ester based photo-radical polymerization initiators include 1-phenyl-1,2-propanedione-2-(o-ethoxycarbonyl) oxime, 1,2-octanedione,1-[4-(phenylthio)-2-(O-benzoyl oxime)], 1-phenyl-1,2-butanedione-2-(o-methoxycarbonyl) oxime, 1,3-diphenylpropanetrione-2-(o-ethoxycarbonyl) oxime, and ethanone,1-[9-ethyl-6-(2-methylbenzoyl)-9H-carbazole-3-yl]-,1-(0-acetyl oxime). Examples of the amino group-containing benzophenone based photo-radical polymerization initiators include 4,4-bis(dimethylamino) benzophenone, and 4,4-bis(diethylamino) benzophenone. Examples of the amino group-containing benzoic acid ester based photo-radical polymerization initiators include ethyl p-dimethylaminobenzoate, 2-ethylhexyl-p-dimethyl aminobenzoate, and ethyl p-diethylaminobenzoate.

For the transparent resin composition according to the present invention, the photo-radical polymerization initiator preferably accounts for 0.01 wt % or more, more preferably 0.1 wt % or more of the solid content in the siloxane resin composition to achieve a sufficient degree of radical curing. On the other hand, from the viewpoint of decreasing the residues of the photo-radical polymerization initiator and improving the solvent resistance, the photo-radical polymerization initiator preferably accounts for 20 wt % or less, more preferably 10 wt % or less.

To allow the transparent resin composition according to the present invention to have positive photosensitivity, it is preferable to add a photoacid generator as a photosensitive agent. If it has positive photosensitivity, it permits easy formation of a transparent coat film having a pattern with fine irregularities. The photoacid generator to use is preferably a quinone diazide compound. It is more preferable for the quinone diazide compound to be an esterification product of a compound having a phenolic hydroxyl group and a quinone diazide sulfonyl chloride. To increase the alkali solubility, part of the phenolic hydroxyl groups may be left unreacted intentionally without esterifying them.

For the transparent resin composition according to the present invention, the quinone diazide compound preferably accounts for 1 to 50 parts by weight relative to 100 parts by weight of the siloxane resin from the viewpoint of pattern processability.

The transparent resin composition according to the present invention may further contain a surfactant (C) other than (C1) and (C2) to serve to further suppress the unevenness during drying and improve the flatness of the colored coat film. Examples of the surfactant (C) other than (C1) and (C2) include anionic surfactants such as ammonium lauryl sulfate and triethanolamine polyoxyethylenealkylethersulfate; cationic surfactants such as stearylamine acetate and lauryl trimethylammonium chloride; amphoteric surfactants such as lauryl dimethylamine oxide and lauryl carboxymethylhydroxyethyl imidazolium betaine; nonionic surfactants such as polyoxyethylene lauryl ether, polyoxyethylene stearyl ether, and sorbitan monostearate; silicone-based surfactants having polydimethyl siloxane or the like as main backbone; fluorochemical surfactants other than (C2); and acrylic surfactants other than (C1).

When a surfactant (C) other than (C1) and (C2) is contained, its content is preferably in a range that will not impede the effect of (C1) and (C2), and specifically, it is preferably 300 ppm or less, more preferably 200 ppm or less in the transparent resin composition.

The transparent resin composition according to the present invention may contain an adhesion improver such as a silane coupling agent, which can act to improve the adhesion between the coat film and the substrate. Examples of the silane coupling agent include silane coupling agents having a functional group such as vinyl group, epoxy group, styryl group, methacryloxy group, acryloxy group, and amino group. More specifically they include 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, 3-chloropropylmethyldimethoxysilane, 3-chloropropyltrimethoxysilane, vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-methacryloxypropyltrimethoxysilane, 3-acryloxypropyltrimethoxysilane, 3-aminopropyltrimethoxysilane, 3-aminopropyltriethoxysilane, 3-triethoxysilyl-N-(1,3-dimethylbutylidene)propylamine, 3-mercaptopropyltrimethoxysilane, 3-ureidopropyltriethoxysilane, 3-isocyanatepropyltriethoxysilane, and p-srytyltrimethoxysilane.

For the transparent resin composition according to the present invention, the adhesion improver preferably accounts for 1 wt % or more, more preferably 2 wt % or more, of the solid content in the transparent resin composition to further improve the adhesion. On the other hand, when the transparent resin composition according to the present invention has photosensitivity, the adhesion improver preferably accounts for 15 wt % or less, more preferably 10 wt % or less, of the solid content in the transparent resin composition to improve the pattern resolution in the alkali development step.

The transparent resin composition according to the present invention may contain various curing agents in order to promote or facilitate the curing of the transparent resin composition. Examples of the curing agents include nitrogen-containing organic substances, silicone resin curing agents, various metal alcoholates, various metal chelate compounds, isocyanate compounds/polymers thereof, methylolated melamine derivatives, methylolated urea derivatives, and siloxane compounds having oxetanyl groups. Two or more of these may be contained together. In particular, metal chelate compounds, methylolated melamine derivatives, and methylolated urea derivatives are preferred from the viewpoint of stability of the curing agents and the processability of the resulting coating films. From the viewpoint of further improving the adhesion to organic films and inorganic films, it is preferable to use a siloxane compound having an oxetanyl group, more preferably a siloxane compound having a plurality of oxetanyl groups.

The curing of the siloxane resin (A) can be promoted by an acid and accordingly, the transparent resin composition may contain a curing catalyst such as a thermal acid generator. Examples of the thermal acid generator include various onium salt based compounds such as aromatic diazonium salts, sulphonium salts, diaryliodonium salts, triaryl sulphonium salts, and triaryl selenium salts, and others such as sulfonic acid esters and halogen compounds.

The transparent resin composition according to the present invention may contain inorganic particles in order to improve the hardness of the transparent coat film and adjust the refractive index of the transparent coat film in an appropriate range. To suite particular purposes, appropriate inorganic particles may be selected from the group consisting of silicon compound particles, aluminum compound particles, tin compound particles, titanium compound particles, zirconium compound particles, barium compound particles, and the like. To permit easy adjustment of refractive index, it is preferable to use silica particles, oxidized zirconia particles, or titanium oxide particles. It is preferable for the inorganic particles to have an average particle diameter of 1 to 200 nm, more preferably 1 to 70 nm from the viewpoint of further improving the transparency of the transparent coat film. The average particle diameter of inorganic particles can be measured by scanning electron microscopy.

Inorganic particles can be prepared by, for example, a procedure including procuring powder of appropriate nanoparticles and crushing or dispersing them using a dispersing machine such as a bead mill or a procedure including preparing a dispersion liquid containing nanoparticles by a sol-gel method and replacing the solvent. Examples of commercial powder products of nanoparticles include Sicastar (silica particles, manufactured by Corefront Corporation), Reolosil (silica particles, manufactured by Tokuyama Corporation), UEP-100 (zirconium oxide particles, manufactured by Daiichi Kigenso Kagaku Kogyo Co., Ltd.), and STR-100N (titanium oxide particles, manufactured by Sakai Chemical Industry Co., Ltd.). Available products of dispersion liquids of inorganic particles include IPA-ST, MIBK-ST, IPA-ST-L, IPA-ST-ZL, PGM-ST, and PMA-ST (all silica particles manufactured by Nissan Chemical Industries, Ltd.), "Oscal" 101, "Oscal" 105, "Oscal" 106, and "Cataloid"-S (all silica particles manufactured by Catalysts & Chemicals Industries Co. Ltd.), "Quartron" PL-1-IPA, PL-1-TOL, PL-2L-PGME, PL-2L-MEK, PL-2L, GP-2L (all silica particles manufactured by Fuso Chemical Co., Ltd.), "Optolake" (registered trademark) TR-502, "Optolake" TR-503, "Optolake" TR-504, "Optolake" TR-513, "Optolake" TR-520, "Optolake" TR-527, "Optolake" TR-528, "Optolake" TR-529, "Optolake" TR-544, and "Optolake" TR-550 (all titanium oxide particles manufactured by JGC Catalysts and Chemicals Co., Ltd.), "Biral" Zr—C20 (titanium oxide particles with average particle diameter of 20 nm manufactured by Taki Chemical Co., Ltd.), ZSL-10A (titanium oxide particles with average particle diameter of 60-100 nm manufactured by Daiichi Kigenso Kagaku Kogyo Co., Ltd.), NanoUse OZ-30 M (titanium oxide particles with average particle diameter of 7 nm manufactured by Nissan Chemical Industries, Ltd.), SZR-M and SZR—K (both zirconium oxide particles manufactured by Sakai Chemical Industry Co., Ltd.), HXU-120JC (oxidized zirconia particles manufactured by Sumitomo Osaka Cement Co., Ltd.), ZR-010 (oxidized zirconia particles manufactured by Solar Co., Ltd.), and ZRPMA (zirconia particles manufactured by C. I. Kasei Co., Ltd.).

From the viewpoint of improving the film hardness of the transparent coat film and realizing easy adjustment of the refractive index, the inorganic particles preferably account for 10 wt % or more and 60 wt % or less, more preferably 20 wt % or more and 40 wt % or less of the solid content in the transparent resin composition.

From the viewpoint of productivity, the solid content in the transparent resin composition according to the present invention is preferably 2 wt % or more, more preferably 5 wt % or more. From the viewpoint of storage stability, on the other hand, the solid content in the transparent resin composition is preferably 60 wt % or less, more preferably 30 wt % or less.

For the transparent resin composition according to the present invention, the surface tension at 25° C. is preferably 26 mN/m or more, more preferably 26.5 mN/m or more, from the viewpoint of suppressing the thinning of the dried coat film along the glass edge. From the viewpoint of further suppressing the unevenness in drying, on the other hand, the surface tension at 25° C. of the transparent resin composition according to the present invention is preferably 28 mN/m or less, more preferably 27.5 mN/m or less. Here, the surface tension is determined at 25° C. by the Wilhelmy method (plate method, perpendicular plate method) using a platinum plate. The surface tension at 25° C. of the colored resin composition according to the present invention can be controlled by, for example, adjusting the content of the fluorine-containing heat-decomposable surfactant (C2), and the surface tension can be controlled in the aforementioned range by, for example, adjusting the content of the fluorine-containing heat-decomposable surfactant (C2) to a value in the aforementioned preferred range.

For the transparent resin composition according to the present invention, the contact angle on non-alkali glass is preferably 1° or more from the viewpoint of achieving a more uniform film thickness along the substrate edge. On the other hand, when the colored resin composition according to the present invention is applied over a substrate by spraying or ink jet, the droplets hitting the surface will be bound more easily as the contact angle decreases, serving to prevent the occurrence of uncoated portions. Thus, for the colored resin composition according to the present invention, the contact angle on non-alkali glass is preferably 12° or less, more preferably 10° or less. Here, the contact angle is determined by dropping the transparent resin composition onto non-alkali glass (#1737, manufactured by Corning Incorporated) cleaned with alkali detergent and taking measurements with a portable contact angle gauge. For the transparent resin composition according to the present invention, the contact angle on non-alkali glass can be controlled by, for example, adjusting the content of the silicon modified acrylic surfactant (C1), and the contact angle can be controlled in the aforementioned range by, for example, adjusting the content of the silicon modified acrylic surfactant (C1) to a value in the aforementioned preferred range.

The refractive index at 550 nm of a transparent coat film prepared from the transparent resin composition according to the present invention is preferably 1.46 or more, more preferably 1.48 or more. On the other hand, the refractive index is preferably 1.54 or less, more preferably 1.52 or less. A decrease in the difference between the refractive index (1.48 to 1.52) of the glass substrate and the refractive index of the transparent coat film works to reduce the visibility of the unevenness attributed to the film thickness of the transparent coat film, thereby improving the appearance. Here, for the present invention, the refractive index can be measured by the prism coupler method.

The transparent resin composition according to the present invention preferably has a viscosity at 25° C. of 3 mPa·s or more, more preferably 5 mPa·s or more, from the viewpoint of ensuring stable coating when the transparent resin composition is applied by an ink jet device over an inclined substrate. On the other hand, the transparent resin composition according to the present invention preferably has a viscosity at 25° C. of 20 mPa·s or less, more preferably 15 mPa·s or less, so that when the transparent resin composition according to the present invention is applied over a substrate by spraying or ink jet, the droplets hitting the surface will be bound easily due to a flow of the droplets, serving to prevent the occurrence of uncoated portions. Here, the viscosity is determined at 25 to 100 rpm by a cone-plate viscometer set at a temperature of 25.0±0.2° C.

Next, the production method for the transparent resin composition according to the present invention is described below. In general, the transparent resin composition according to the present invention is produced by stirring and mixing the siloxane resin (A), organic solvent (B), surfactant (C), and other components as required.

The transparent coat film according to the present invention can be produced by curing the transparent resin composition according to the present invention. A method for forming a transparent coat film from the transparent resin composition is described below taking a negative type photosensitive transparent resin composition as an example.

The photosensitive transparent resin composition is spread on a glass substrate to form a coat film. Useful glass materials for the substrate include, for example, soda glass, non-alkali glass, quartz glass, and aluminosilicate glass, which may be chemically strengthened. Useful coating methods include, for example, spin coating using a spinner, spray coating, ink jet coating, die coating, and roll coating, of which spray coating and ink jet coating are preferred for the present invention. A coat film with an appropriate film thickness can be prepared by adopting a suitable coating method. Commonly, the coating film will have a film thickness of 1 to 150 μm after drying.

The resulting coating film is dried to provide a dried film. Useful drying methods include, for example, heat drying, air drying, vacuum drying, and infrared ray exposure. Useful heat drying instruments include, for example, oven and hot plate. The drying temperature is preferably 50° C. to 150° C., and the drying time is preferably one minute to several hours.

An actinic ray is applied to the resulting dried film through a mask having an intended pattern to provide an exposed film. Actinic rays available for the light exposure step include ultraviolet ray, visible light, electron beam, and X-ray. For the colored resin composition according to the present invention, it is preferable to use the i-line (365 nm), h-line (405 nm), or g-line (436 nm) of mercury lamps.

The resulting exposed film is developed with an alkaline developer etc. to remove the unexposed portions, thereby producing a pattern. Alkaline compounds that can be used as the alkaline developer include, for example, inorganic alkali substances including sodium hydroxide, potassium hydroxide, sodium carbonate, potassium carbonate, sodium silicate, sodium metasilicate, and aqueous ammonia; and organic alkali substances including primary amines such as ethyl amine and n-propyl amine; secondary amines such as diethyl amine and di-n-propyl amine; tertiary amines such as triethyl amine and methyldiethyl amine; tetraalkyl ammonium hydroxides such as tetramethyl ammonium hydroxide (TMAH); quaternary ammonium salts such as choline; alcoholamines such as triethanol amine, diethanol amine, monoethanol amine, dimethyl aminoethanol, and diethyl aminoethanol; and cyclic amines such as pyrrole, piperidine, 1,8-diaza-bicyclo[5,4,0]-7-undecene, 1,5-diaza-bicyclo[4,3,0]-5-nonane, and morpholine.

The concentration of the alkaline compound in an alkaline developer is generally 0.01 to 50 mass % and preferably 0.02 to 1 mass %. In addition, in order to obtain a better pattern shape after the development step, a surfactant such as nonionic surfactant may be added to 0.1 to 5 mass %. When the developer is an alkali aqueous solution, furthermore, a water-soluble organic solvent such as ethanol, γ-butyrolactone, dimethyl formamide, and N-methyl-2-pyrrolidone may be added to the developer.

Good development methods include, for example, dipping, spraying, and paddling. The resulting pattern may be rinsed with pure water etc.

The resulting pattern is heat-treated (postbaking) to provide a patterned transparent coat film. The heat treatment may be performed in air, nitrogen atmosphere, or a vacuum. The heating temperature is preferably 150° C. to 300° C., and the drying time is preferably 0.25 to 5 hours. The heating temperature may be changed continuously or stepwise.

Even when patterning of the transparent coat film is not necessary, it is preferable that heat treatment is performed after exposing the entire dried film surface to light to photocure the transparent coat film. The photocuring step performed before heat treatment serves to prevent rapid film shrinkage from being caused by the heat treatment, thereby ensuring stronger adhesion between the transparent coat film and the glass substrate.

The transparent resin-coated glass substrate according to the present invention contains a glass substrate and a transparent coat film thereon. In addition, the decorative glass substrate according to the present invention further contains a colored layer on top of the transparent coat film. There are no specific limitations on the material or formation method used to form the colored layer. A transparent refractive index adjusting layer may be provided instead of, or in addition to, the colored layer. For examples, an inorganic film may be used as the transparent refractive index adjusting layer. There are no specific limitations on the formation method used to form the transparent refractive index adjusting layer.

The transparent resin composition according to the present invention can be suitably used to produce a glass reinforcement resin layer to be incorporated in the cover glass that covers the front surface of a display device such as smart phones and tablet PCs or an on-vehicle display device or instrument panel.

EXAMPLES

The present invention will now be illustrated in more detail with reference to Examples and Comparative examples, but it should be understood that the invention is not construed as being limited to these examples.

<Evaluation Methods>

'Surface Tension'

For the transparent resin composition prepared in each Example or Comparative example, the surface tension was measured at 25° C. by an automatic surface tensiometer K11 (manufactured by KRUSS) using a platinum plate.

'Contact Angle'

The contact angle was determined by dropping the transparent resin composition prepared in each Example or Comparative example onto non-alkali glass (#1737, manufactured by Corning Incorporated) cleaned with alkali detergent (Haemo-Sol HEM026-058, manufactured by Wakenyaku Co., Ltd.) and taking measurements with a portable contact angle gauge PCA-1 (manufactured by Kyowa Interface Science Co., Ltd.).

'Viscosity'

For the transparent resin composition prepared in each Example or Comparative example, the viscosity was measured at 50 rpm using a viscometer (RE105 L, manufactured by Toki Sangyo Co., Ltd.) set at a temperature of 25.0±0.2° C.

'Refractive Index'

For the transparent coat film on a 4 inch silicone wafer prepared in each Example or Comparative example, the refractive index at a wavelength of 550 nm was measured using a prism coupler (PC2000, manufactured by Metricon).

'Transmittance'

For the prebaked film and cured transparent coat film on a 5 cm×5 cm Tempax glass substrate prepared in each Example or Comparative example, the transmittance at a measuring wavelength of 400 nm of a specimen having a film thickness of 1.5 µm was determined using an ultraviolet-visible spectrophotometer UV-2600 (manufactured by Shimadzu Corporation).

'Pin Hole of Coating'

The transparent coat film prepared in each Example or Comparative example was placed under a fluorescent light and observed visually, and the degree of pin hole was evaluated according to the criteria given below. From the viewpoint of industrial application, test pieces rated as A or B were decided to be acceptable.

A: No pinholes are found in coat film observation under a fluorescent light and under a Na lamp.
B: No pinholes are found in coat film observation under a fluorescent light, but depressions attributable to pinholes are found in coat film observation under a Na lamp.
C: An uncoated region is found on the substrate.

'Drying Unevenness'

The central portion of the transparent coat film prepared in each Example or Comparative example was placed under a fluorescent light or under a Na lamp and observed visually, and the degree of drying unevenness was evaluated according to the criteria given below. From the viewpoint of industrial application, test pieces rated as A or B were decided to be acceptable.

A: No unevenness is found in coat film observation under a fluorescent light and under a Na lamp.
B: No unevenness is found in coat film observation under a fluorescent light, but some unevenness is found in coat film observation under a Na lamp.
A: Unevenness is found in coat film observation under a fluorescent light.

'Unevenness Along Glass Edge Portion'

The glass edge portion of the transparent coat film prepared in each Example or Comparative example was placed under a fluorescent light or under a Na lamp and observed visually, and the degree of interference unevenness was evaluated according to the criteria given below. From the viewpoint of industrial application, test pieces rated as A or B were decided to be acceptable.

A: No unevenness is found in coat film observation under a fluorescent light and under a Na lamp.
B: No unevenness is found in coat film observation under a fluorescent light, but some unevenness is found in coat film observation under a Na lamp.
C: Unevenness is found in coat film observation under a fluorescent light.

'Glass Surface Strength'

The transparent coat film prepared in each Example or Comparative example was placed on a support ring (diameter 35 mm) and a load ring (diameter 17.5 mm) was pressed into it at a rate of 10 mm/min to measure the strength at the time of breakage of the glass by a static test apparatus AG-Xplus (manufactured by Shimadzu Corporation), and the strength of the glass surface was evaluated according to the criteria given below. From the viewpoint of industrial application, test pieces rated as A or B were decided to be acceptable. Uncoated glass free of the transparent coat film had a glass surface strength of 800 MPa.

A: The glass surface strength is 900 MPa or more.
B: The glass surface strength is 800 or more and less than 900 MPa.
C: The glass surface strength is less than 800 MPa.

'Adhesion Strength'

On the transparent coat film prepared in each Example or Comparative example, black ink (GLS-HF979, manufactured by Teikoku Printing Inks Mfg. Co., Ltd.) was applied by a screen printing machine in such a manner the film would have a thickness of 8 μm after drying, and heat-cured at 160° C. for 1 hour by a hot air oven. The glass substrate carrying a transparent coat film and a black film was immersed in boiling pure water for 10 minutes and dried, and then the adhesion between the transparent coat film and the glass substrate was evaluated according to the cross-cut tape peel test specified in JIS K 5400 8.5.2 (1990). Specifically, a cutter blade was pressed into the layers of the stacked transparent coat film and black ink film on the glass substrate until it reached the body of the glass plate, and 11 longitudinal parallel cuts with intervals of 1 mm and another 11 transverse parallel cuts, which were perpendicular to the former, were made to produce 100 squares each having a size of 1 mm×1 mm. A piece of adhesive cellophane tape (width 18 mm, adhesive strength 3.7 N/10 mm) was pasted on the cut ITO surface and rubbed by a rubber eraser (conforming to JIS S 6050) to ensure good adhesion, and an end of the tape was held and pulled up quickly in the vertical direction to the plate to achieve instantaneous peeling, followed by visually counting the number of squares left unremoved. Evaluations were made based on the peeled area deprived of squares, and test pieces rated as 4B or higher were decided to be acceptable.

5B: The peeled area accounted for 0%.
4B: The peeled area accounted for more than 0% and less than 5%.
3B: The peeled area accounted for 5% or more and less than 15%.
2B: The peeled area accounted for 15% or more and less than 35%.
1B: The peeled area accounted for 35% or more and less than 65%.
0B: The peeled area accounted for 65% or more and less than 100%.

Synthesis Example 1

In a 500 ml three-necked flask, 47.67 g (0.35 mol) of methyl trimethoxysilane, 39.66 g (0.20 mol) of phenyl trimethoxysilane, 26.23 g (0.10 mol) of 3-trimethoxysilyl propylsuccinic acid, 82.04 g (0.35 mol) of γ-acryloylpropyl trimethoxysilane, and 180.56 g of diacetone alcohol (hereinafter DAA) were fed and, while stirring in an oil bath at 40° C., an aqueous phosphoric acid solution prepared by dissolving 0.401 g (accounting for 0.2 parts by mass relative to monomers fed) of phosphoric acid in 55.8 g of water was dropped over 10 minutes through a dropping funnel. After stirring at 40° C. for 1 hour, additional stirring was performed for 1 hour in the oil bath set at a temperature of 70° C., followed by heating up the oil bath to reach 115° C. over 30 minutes. One hour after the start of temperature rise, the internal temperature in the solution reached 100° C. and heating was continued further while stirring for additional 2 hours (the internal temperature maintained at 100° C. to 110° C.). A total of 120 g of methanol and water was distilled out as by-products from the reaction. DAA was added to the resulting solution of polysiloxane in DAA until the polymer concentration reached 40 mass % to prepare a polysiloxane solution (PS-1). The weight average molecular weight (hereinafter Mw) of the resulting polymer was measured by GPC and found to be 5,000 (in terms of polystyrene).

Synthesis Example 2

In a 500 ml three-necked flask, 106.54 g (0.70 mol) of tetraethoxysilane, 10.87 g (0.30 mol) of methyl trimethoxysilane, and 85.92 g of DAA were fed and, while stirring in an oil bath at 40° C., an aqueous phosphoric acid solution prepared by dissolving 0.401 g (accounting for 0.2 parts by mass relative to monomers fed) of phosphoric acid in 55.8 g of water was dropped over 10 minutes through a dropping funnel. After stirring at 40° C. for 1 hour, additional stirring was performed for 1 hour in the oil bath set at a temperature of 70° C., followed by heating up the oil bath to reach 115° C. over 30 minutes. One hour after the start of temperature rise, the internal temperature in the solution reached 100° C. and heating was continued further while stirring for additional 2 hours (the internal temperature maintained at 100° C. to 110° C.). A total of 182 g of methanol and water was distilled out as by-products from the reaction. DAA was added to the resulting solution of polysiloxane in DAA until the polymer concentration reached 40 mass % to prepare a polysiloxane solution (PS-2). Here, the weight average molecular weight of the resulting polymer was measured by GPC and found to be 3,000 (in terms of polystyrene).

Synthesis Example 3

In a 500 ml three-necked flask, 91.32 g (0.60 mol) of tetraethoxysilane, 56.79 g (0.30 mol) of phenyl trimethoxysilane, 24.64 g (0.10 mol) of 2-(3,4-epoxycyclohexyl)ethyl trimethoxysilane, and 152.91 g of DAA were fed and, while stirring in an oil bath at 40° C., an aqueous phosphoric acid solution prepared by dissolving 0.401 g (accounting for 0.2 parts by mass relative to monomers fed) of phosphoric acid in 55.8 g of water was dropped over 10 minutes through a dropping funnel. After stirring at 40° C. for 1 hour, additional stirring was performed for 1 hour in the oil bath set at a temperature of 70° C., followed by heating up the oil bath to reach 115° C. over 30 minutes. One hour after the start of temperature rise, the internal temperature in the solution reached 100° C. and heating was continued further while stirring for additional 2 hours (the internal temperature maintained at 100° C. to 110° C.). A total of 177 g of methanol and water was distilled out as by-products from the reaction. DAA was added to the resulting solution of polysiloxane in DAA until the polymer concentration reached 40 mass % to prepare a polysiloxane solution (PS-3). Here, the weight average molecular weight of the resulting polymer was measured by GPC and found to be 4,000 (in terms of polystyrene).

Synthesis Example 4

In a 500 ml three-necked flask, 54.48 g (0.40 mol) of methyl trimethoxysilane, 99.15 g (0.50 mol) of phenyl trimethoxysilane, 24.64 g (0.10 mol) of 2-(3,4-epoxycyclohexyl) ethyl trimethoxysilane, and 163.35 g of DAA were fed and, while stirring at room temperature, an aqueous phosphoric acid solution prepared by dissolving 0.535 g (accounting for 0.3 parts by mass' relative to monomers fed) of phosphoric acid in 54.0 g of water was dropped over 10 minutes through a dropping funnel. After stirring at 40° C. for 1 hour, additional stirring was performed for 1 hour in the oil bath set at a temperature of 70° C., followed by heating up the oil bath to reach 115° C. over 30 minutes. One hour after the start of temperature rise, the internal temperature in the solution reached 100° C. and heating was continued further while stirring for additional 2 hours (the internal temperature maintained at 100° C. to 110° C.). A total of 177 g of methanol and water was distilled out as by-products from the reaction. DAA was added to the resulting solution of polysiloxane in DAA until the polymer concentration reached 45 mass % to prepare a polysiloxane solution (PS-4). Here, the weight average molecular weight of the resulting polymer was measured by GPC and found to be 3,000 (in terms of polystyrene).

Synthesis Example 5

In a 500 ml flask, 3 g of 2,2'-azobis(isobutyronitrile) and 50 g of PGMEA propylene glycol methyl ether acetate (hereinafter PGMEA) were fed. Subsequently, 30 g of methacrylic acid, 35 g of benzyl methacrylate, and 35 g of tricyclo[5.2.1.0$^{2,6}$]decane-8-yl methacrylate were fed and stirred for a while at room temperature, followed by filling the flask with nitrogen and stirring while heating at 70° C. for 5 hours. Then, 15 g of glycidyl methacrylate, 1 g of dimethylbenzyl amine, 0.2 g of p-methoxyphenol, and 100 g of PGMEA were add to the resulting solution, followed by stirring while heating at 90° C. for 4 hours to prepare an acrylic resin solution (PA-1). PGMEA was added to the resulting acrylic resin solution (PA-1) until the solid content reached 40 wt %. The acrylic resin had a weight average molecular weight of 10,000 and an acid value of 118 mgKOH/g.

Example 1

Under a yellow light, 1.58 g of phenyl bis(2,4,6-trimethylbenzoyl) phosphine oxide (trade name Irgacure (registered trademark) 819 (abbreviated as IC-819 in Table 1), manufactured by Ciba Specialty Chemicals Inc.) and 0.77 g of zirconium tetraacetylacetonate (trade name Orgatix ZC-150, manufactured by Matsumoto Fine Chemical Co. Ltd.) were dissolved in a mixed solvent of 23.44 g of DAA (boiling point 169° C.), 1.01 g of PGMEA (boiling point 146° C.), and 14.80 g of 3-methyl-3-methoxy-1-butanol (boiling point 174° C., hereinafter MMB), and then 0.59 g of oxetanyl group-containing siloxane compound Arone Oxetane (registered trademark) OXT-19, 4.52 g of acrylate of tris-(2-hydroxyethyl)isocyanuric acid (trade name Aronix (registered trademark) M-315, manufactured by Toagosei Co., Ltd.), 0.45 g of 3-aminopropyl trimethoxysilane (trade name KBM-903, manufactured by Shin-Etsu Chemical Co., Ltd.), 22.60 g of polysiloxane solution (PS-1), 30.14 g of a PGMEA 30 wt % dispersion liquid of silica particles (trade name PMA-ST, manufactured by Nissan Chemical Industries, Ltd.), 0.05 g (corresponding to a concentration of 25 ppm) of a PGMEA 5 wt % solution of a silicon modified acrylic surfactant (trade name BYK (registered trademark)-3550, manufactured by BYK-Chemie Japan), and 0.05 g (corresponding to a concentration of 25 ppm) of PGMEA 5 wt % solution of a fluorine-containing heat-decomposable surfactant (trade name DS-21, manufactured by DIC Corporation) were added and stirred. Subsequently, filtration was performed using a filter of 1.00 μm to prepare a siloxane resin composition C-1 having a solid content of 26 wt %. The siloxane resin composition C-1 had a surface tension of 27.9 mN/m, a contact angle of 8.5°, and a viscosity of 6.5 mPa·s.

A non-alkali glass (1737, manufactured by Corning Incorporated) substrate with a film thickness of 0.7 μm, a 4 inch silicone wafer, or a 5 cm×5 cm Tempax glass substrate (manufactured by Asahi Techno Glass Corp) was coated with the resulting transparent resin composition C-1 using an ink jet coater (Xaar1002 printhead, manufactured by Nakan Techno Co., Ltd.) under the conditions of a DPD (number of droplets in one dot) of 4, a scanning speed of 100 m/min, and a voltage of +1.25 V, and prebaked on a hot plate at 90° C. for 2 minutes. Here, the prebaked film had a transmittance of 97%. Subsequently, light exposure was performed at 500 mJ/cm$^2$ using a light exposure machine XG-5000, manufactured by Dainippon Screen Mfg. Co., Ltd., and curing was performed using a hot air oven at 180° C. for 30 minutes. In this way, a transparent coat film A-1 having a thickness of 1.5 μm was prepared. Evaluation results regarding the transparent coat film A-1 are given in Table 2.

Example 2

Except for adding 0.10 g (corresponding to a concentration of 50 ppm) of the PGMEA 5 wt % solution of a silicon modified acrylic surfactant BYK-3550 and 0.10 g (corresponding to a concentration of 50 ppm) of the PGMEA 5 wt % solution of a fluorine-containing heat-decomposable surfactant DS-21, the same procedure as in Example 1 was carried out to produce a siloxane resin composition C-2. The siloxane resin composition C-2 had a surface tension of 27.3 mN/m, a contact angle of 8.9°, and a viscosity of 6.5 mPa·s, and the prebaked film had a transmittance of 97%. For the siloxane resin composition C-2, the same procedure as in Example 1 was carried out to produce a transparent coat film A-2, which was evaluated and gave results as shown in Table 2.

Example 3

Except for adding 0.20 g (corresponding to a concentration of 100 ppm) of the PGMEA 5 wt % solution of a silicon modified acrylic surfactant BYK-3550 and 0.20 g (corresponding to a concentration of 100 ppm) of the PGMEA 5 wt % solution of a fluorine-containing heat-decomposable surfactant DS-21, the same procedure as in Example 1 was carried out to produce a siloxane resin composition C-3. The siloxane resin composition C-3 had a surface tension of 26.9 mN/m, a contact angle of 9.3°, and a viscosity of 6.5 mPa·s, and the prebaked film had a transmittance of 97%. For the siloxane resin composition C-3, the same procedure as in Example 1 was carried out to produce a transparent coat film A-3, which was evaluated and gave results as shown in Table 2.

Example 4

Except for adding 0.40 g (corresponding to a concentration of 200 ppm) of the PGMEA 5 wt % solution of a silicon modified acrylic surfactant BYK-3550 and 0.40 g (corresponding to a concentration of 200 ppm) of the PGMEA 5 wt % solution of a fluorine-containing heat-decomposable surfactant DS-21, the same procedure as in Example 1 was carried out to produce a siloxane resin composition C-4. The siloxane resin composition C-4 had a surface tension of 26.4 mN/m, a contact angle of 10.1°, and a viscosity of 6.5 mPa·s, and the prebaked film had a transmittance of 97%. For the siloxane resin composition C-4, the same procedure as in Example 1 was carried out to produce a transparent coat film A-4, which was evaluated and gave results as shown in Table 2.

Example 5

Except for adding 0.10 g (corresponding to a concentration of 50 ppm) of the PGMEA 5 wt % solution of a silicon modified acrylic surfactant BYK-3550 and 0.10 g (corresponding to a concentration of 50 ppm) of the PGMEA 5 wt % solution of a fluorine-containing heat-decomposable surfactant DS-21, and further adding 0.10 g (corresponding to a concentration of 50 ppm) of the PGMEA 5 wt % solution of a silicon based surfactant (trade name BYK-333, manufactured by BYK-Chemie Japan), the same procedure as in Example 1 was carried out to produce a siloxane resin composition C-5. The siloxane resin composition C-5 had a surface tension of 26.8 mN/m, a contact angle of 10.2°, and a viscosity of 6.5 mPa·s, and the prebaked film had a transmittance of 97%. For the siloxane resin composition C-5, the same procedure as in Example 1 was carried out to produce a transparent coat film A-5, which was evaluated and gave results as shown in Table 2.

Example 6

Except for adding 0.30 g (corresponding to a concentration of 150 ppm) of the PGMEA 5 wt % solution of a silicon modified acrylic surfactant BYK-3550 and 0.10 g (corresponding to a concentration of 50 ppm) of the PGMEA 5 wt % solution of a fluorine-containing heat-decomposable surfactant DS-21, the same procedure as in Example 1 was carried out to produce a siloxane resin composition C-6. The siloxane resin composition C-6 had a surface tension of 27.6 mN/m, a contact angle of 8.6°, and a viscosity of 6.5 mPa·s, and the prebaked film had a transmittance of 97%. For the siloxane resin composition C-6, the same procedure as in Example 1 was carried out to produce a transparent coat film A-6, which was evaluated and gave results as shown in Table 2.

Example 7

Except for adding 0.10 g (corresponding to a concentration of 50 ppm) of the PGMEA 5 wt % solution of a silicon modified acrylic surfactant BYK-3550 and 0.30 g (corresponding to a concentration of 150 ppm) of the PGMEA 5 wt % solution of a fluorine-containing heat-decomposable surfactant DS-21, the same procedure as in Example 1 was carried out to produce a siloxane resin composition C-7. The siloxane resin composition C-7 had a surface tension of 26.2 mN/m, a contact angle of 9.8°, and a viscosity of 6.5 mPa·s, and the prebaked film had a transmittance of 97%. For the siloxane resin composition C-7, the same procedure as in Example 1 was carried out to produce a transparent coat film A-7, which was evaluated and gave results as shown in Table 2.

Example 8

First, 65.00 g of the polysiloxane solution (PS-2) was dissolved in 19.80 g of PGMEA and 14.80 g of MMB, and then 0.20 g (corresponding to a concentration of 100 ppm) of the PGMEA 5 wt % solution of a silicon modified acrylic surfactant BYK-3550 and 0.20 g (corresponding to a concentration of 100 ppm) of the PGMEA 5 wt % solution of a fluorine-containing heat-decomposable surfactant DS-21 were added and stirred. Subsequently, filtration was performed using a filter of 0.45 μm to prepare a siloxane resin composition C-8 having a solid content of 26 wt %. The siloxane resin composition C-8 had a surface tension of 26.9 mN/m, a contact angle of 9.2°, and a viscosity of 5.7 mPa·s, and the prebaked film had a transmittance of 99%. For the siloxane resin composition C-8, the same procedure as in Example 1 was carried out to produce a transparent coat film A-8, which was evaluated and gave results as shown in Table 2.

Example 9

First, 52.00 g of the polysiloxane solution (PS-2) was dissolved in 13.00 g of DAA, 2.47 g of PGMEA and 14.80 g of MMB, and then 17.33 g of the PGMEA 30 wt % dispersion liquid of titanium oxide particles (trade name TR-513, manufactured by JGC Catalysts and Chemicals Co., Ltd.), 0.20 g (corresponding to a concentration of 100 ppm) of the PGMEA 5 wt % solution of a silicon modified acrylic surfactant (trade name BYK-3550, manufactured by BYK-Chemie Japan) and 0.20 g (corresponding to a concentration of 100 ppm) of the PGMEA 5 wt % solution of a fluorine-containing heat-decomposable surfactant (trade name DS-21, manufactured by DIC Corporation) were added and stirred. Subsequently, filtration was performed using a filter of 1.00 μm to prepare a siloxane resin composition C-9 having a solid content of 26 wt %. The siloxane resin composition C-9 had a surface tension of 27.0 mN/m, a contact angle of 9.3°, and a viscosity of 5.5 mPa·s, and the prebaked film had a transmittance of 99%. For the siloxane resin composition C-9, the same procedure as in Example 1 was carried out to produce a transparent coat film A-9, which was evaluated and gave results as shown in Table 2.

Example 10

Except for adding 65.00 g of the polysiloxane solution (PS-3) instead of 65.00 g of the polysiloxane solution (PS-2), the same procedure as in Example 8 was carried out to produce a siloxane resin composition C-10 having a solid content of 26 wt %. The siloxane resin composition C-10 had a surface tension of 27.0 mN/m, a contact angle of 9.2°, and a viscosity of 5.9 mPa·s, and the prebaked film had a transmittance of 99%. For the siloxane resin composition C-10, the same procedure as in Example 1 was carried out to produce a transparent coat film A-10, which was evaluated and gave results as shown in Table 2.

Example 11

Under a yellow light, 1.52 g of a quinone diazide compound as represented by the structural formula (14) given below (trade name TAS-200A, manufactured by Toyo Gosei Co., Ltd.) and 0.34 g of a crosslinked accelerator as represented by the structural formula (15) given below (trade name MDT, manufactured by Heraeus K.K.) were dissolved in a mixed solvent of 5.28 g of DAA, 9.78 g of PGMEA, and 22.20 g of 3-methyl-3-methoxy-1-butyl acetate (boiling point 188° C., hereinafter MMB-AC), and then 0.51 g of tris-(trimethoxysilylpropyl) isocyanurate (trade name KBM-9659, manufactured by Shin-Etsu Chemical Co., Ltd.), 37.49 g of the polysiloxane solution (PS-4), 22.49 g of a PGMEA 30 wt % dispersion liquid of silica particles (trade name PMA-ST, manufactured by Nissan Chemical Industries, Ltd.), 0.20 g (corresponding to a concentration of 100 ppm) of a PGMEA 5 wt % solution of a silicon modified acrylic surfactant (trade name BYK (registered trademark)-3550, manufactured by BYK-Chemie Japan), and 0.20 g (corresponding to a concentration of 100 ppm) of a PGMEA 5 wt % solution of a fluorine-containing heat-decomposable surfactant (trade name DS-21, manufactured by DIC Corporation) were added and stirred. Subsequently, filtration was performed using a filter of 1.00 μm to prepare a siloxane resin composition C-11 having a solid content of 26 wt %.

[Chemical formula 10]

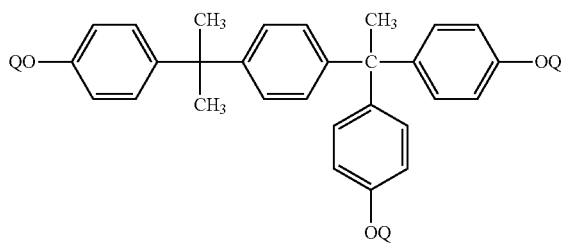

(14)

[Chemical formula 11]

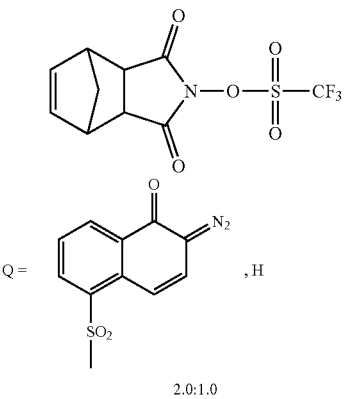

(15)

2.0:1.0

The siloxane resin composition C-11 had a surface tension of 26.5 mN/m, a contact angle of 9.5°, and a viscosity of 6.9 mPa·s, and the light-exposed film had a transmittance of 98%. For the siloxane resin composition C-11, the same procedure as in Example 1 was carried out to produce a transparent coat film A-11, which was evaluated and gave results as shown in Table 2.

Example 12

0.36 g of a crosslinked accelerator as represented by the structural formula (15) (trade name MDT, manufactured by Heraeus K.K.) was dissolved in a mixed solvent of 4.00 g of DAA, 8.80 g of PGMEA, and 22.20 g of MMB-AC, and then 0.54 g of tris-(trimethoxysilylpropyl) isocyanurate (trade name KBM-9659, manufactured by Shin-Etsu Chemical Co., Ltd.), 37.49 g of the polysiloxane solution (PS-4), 23.89 g of a PGMEA 30 wt % dispersion liquid of silica particles (trade name PMA-ST, manufactured by Nissan Chemical Industries, Ltd.), 0.20 g (corresponding to a concentration of 100 ppm) of a PGMEA 5 wt % solution of a silicon modified acrylic surfactant (trade name BYK (registered trademark)-3550, manufactured by BYK-Chemie Japan), and 0.20 g (corresponding to a concentration of 100 ppm) of a PGMEA 5 wt % solution of a fluorine-containing heat-decomposable surfactant (trade name DS-21, manufactured by DIC Corporation) were added and stirred. Subsequently, filtration was performed using a filter of 1.00 μm to prepare a siloxane resin composition C-12 having a solid content of 26 wt %.

The siloxane resin composition C-12 had a surface tension of 26.5 mN/m, a contact angle of 9.7°, and a viscosity of 6.6 mPa·s, and the prebaked and light-exposed film had a transmittance of 99%. Except for using the siloxane resin composition C-12 and omitting the light exposure step, the same procedure as in Example 1 was carried out to produce a transparent coat film A-12, which was evaluated and gave results as shown in Table 2.

Comparative Example 1

Except for omitting the addition of the silicon modified acrylic surfactant BYK-3550 and the fluorine-containing heat-decomposable surfactant DS-21 and adding 0.40 g (corresponding to a concentration of 200 ppm) of the PGMEA 5 wt % solution of a silicon based surfactant (trade name BYK-333, manufactured by BYK-Chemie Japan), the same procedure as in Example 1 was carried out to produce a siloxane resin composition C-13. The siloxane resin composition C-13 had a surface tension of 25.9 mN/m, a contact angle of 12.1°, and a viscosity of 6.5 mPa·s, and the prebaked film had a transmittance of 97%. Using the siloxane resin composition C-13, the same procedure as in Example 1 was carried out to produce a transparent coat film A-13, which was evaluated and gave results as shown in Table 2.

Comparative Example 2

Except for omitting the addition of the silicon modified acrylic surfactant BYK-3550 and the fluorine-containing heat-decomposable surfactant DS-21 and adding 0.40 g (corresponding to a concentration of 200 ppm) of the PGMEA 5 wt % solution of a fluorine based surfactant (trade name F-477, manufactured by DIC Corporation), the same procedure as in Example 1 was carried out to produce a siloxane resin composition C-14. The siloxane resin composition C-14 had a surface tension of 26.2 mN/m, a contact angle of 11.5°, and a viscosity of 6.5 mPa·s, and the prebaked film had a transmittance of 97%. Using the siloxane resin composition C-14, the same procedure as in Example 1 was carried out to produce a transparent coat film A-14, which was evaluated and gave results as shown in Table 2.

Comparative Example 3

Except for adding 0.40 g (corresponding to a concentration of 200 ppm) of the PGMEA 5 wt % solution of a silicon modified acrylic surfactant BYK-3550 and omitting the addition of the fluorine-containing heat-decomposable surfactant DS-21, the same procedure as in Example 1 was carried out to produce a siloxane resin composition C-15. The siloxane resin composition C-15 had a surface tension of 28.4 mN/m, a contact angle of 7.9°, and a viscosity of 6.5 mPa·s, and the prebaked film had a transmittance of 97%. Using the siloxane resin composition C-15, the same procedure as in Example 1 was carried out to produce a transparent coat film A-15, which was evaluated and gave results as shown in Table 2.

Comparative Example 4

Except for omitting the addition of the silicon modified acrylic surfactant BYK-3550 and adding 0.40 g (corresponding to a concentration of 200 ppm) of the PGMEA 5 wt % solution of a fluorine-containing heat-decomposable surfactant DS-21, the same procedure as in Example 1 was carried out to produce a siloxane resin composition C-16. The siloxane resin composition C-16 had a surface tension of 26.2 mN/m, a contact angle of 11.0°, and a viscosity of 6.5 mPa·s, and the prebaked film had a transmittance of 97%. Using the siloxane resin composition C-16, the same procedure as in Example 1 was carried out to produce a transparent coat film A-16, which was evaluated and gave results as shown in Table 2.

Comparative Example 5

Except for adding 0.02 g (corresponding to a concentration of 10 ppm) of the PGMEA 5 wt % solution of a silicon modified acrylic surfactant BYK-3550 and 0.02 g (corresponding to a concentration of 10 ppm) of the PGMEA 5 wt % solution of a fluorine-containing heat-decomposable surfactant DS-21, the same procedure as in Example 1 was carried out to produce a siloxane resin composition C-17. The siloxane resin composition C-17 had a surface tension of 28.6 mN/m, a contact angle of 8.2°, and a viscosity of 6.5 mPa·s, and the prebaked film had a transmittance of 97%. Using the siloxane resin composition C-17, the same procedure as in Example 1 was carried out to produce a transparent coat film A-17, which was evaluated and gave results as shown in Table 2.

Comparative Example 6

Except for adding 0.60 g (corresponding to a concentration of 300 ppm) of the PGMEA 5 wt % solution of a silicon modified acrylic surfactant BYK-3550 and 0.60 g (corresponding to a concentration of 300 ppm) of the PGMEA 5 wt % solution of a fluorine-containing heat-decomposable surfactant DS-21, the same procedure as in Example 1 was carried out to produce a siloxane resin composition C-18. The siloxane resin composition C-18 had a surface tension of 25.8 mN/m, a contact angle of 10.6°, and a viscosity of 6.5 mPa·s, and the prebaked film had a transmittance of 97%. Using the siloxane resin composition C-18, the same procedure as in Example 1 was carried out to produce a transparent coat film A-18, which was evaluated and gave results as shown in Table 2.

Comparative Example 7

Except for adding 0.20 g (corresponding to a concentration of 100 ppm) of the PGMEA 5 wt % solution of a fluorine based surfactant (trade name F-477, manufactured by DIC Corporation) instead of the fluorine-containing heat-decomposable surfactant DS-21, the same procedure as in Example 3 was carried out to produce a siloxane resin composition C-19. The siloxane resin composition C-19 had a surface tension of 26.8 mN/m, a contact angle of 11.0°, and a viscosity of 6.5 mPa·s, and the prebaked film had a transmittance of 97%. Using the siloxane resin composition C-19, the same procedure as in Example 1 was carried out to produce a transparent coat film A-19, which was evaluated and gave results as shown in Table 2.

Comparative Example 8

Under a yellow light, 1.67 g of a phenyl bis(2,4,6-trimethylbenzoyl) phosphine oxide Irgacure 819 was dissolved in a mixed solvent of 37.00 g of DAA, 3.94 g of PGMEA, and 14.80 g of MMB, and then 4.77 g of the acrylate of tris-(2-hydroxyethyl)isocyanuric acid Aronix M-315, 7.15 g of dipentaerythritol hexaacrylate (trade name Kayarad (registered trademark) DPHA, manufactured by Nippon Kayaku Co., Ltd.), 0.48 g of 3-aminopropyl trimethoxysilane KBM-903, 29.79 g of the acrylic resin solution (PA-1), 0.20 g (corresponding to a concentration of 100 ppm) of the PGMEA 5 wt % solution of a silicon modified acrylic surfactant BYK-3550, and 0.20 g (corresponding to a concentration of 100 ppm) of the PGMEA 5 wt % solution of a fluorine-containing heat-decomposable surfactant DS-21 were added and stirred. Subsequently, filtration was performed using a filter of 1.00 μm to prepare an acrylic resin composition A-1 having a solid content of 26 wt %. The acrylic resin composition A-1 had a surface tension of 26.9 mN/m, a contact angle of 9.1°, and a viscosity of 6.0 mPa·s, and the prebaked film had a transmittance of 96%. Using the acrylic resin composition A-1, the same procedure as in Example 1 was carried out to produce a transparent coat film A-20, which was evaluated and gave results as shown in Table 2.

The components used in each Example and Comparative example are shown in Table 1, and evaluation results are shown in Table 2.

TABLE 1

| | transparent resin composition | resin (A) | organic solvent (B) | surfactant (C) | | | others | | | | |
|---|---|---|---|---|---|---|---|---|---|---|---|
| | | | | surfactant (C1) | surfactant (C2) | other surfactant | inorganic particles | reactive monomer | photosensitive agent | adhesion improver | curing agent |
| Example 1 | C-1 | siloxane resin (PS-1) | PGMEA/MMB/DAA | BYK-3550:25 ppm | DS-21:25 ppm | — | SiO$_2$ | M-315 | IC-819 | KBM-903 | ZC-150 OXT-191 |
| Example 2 | C-2 | siloxane resin (PS-1) | PGMEA/MMB/DAA | BYK-3550:50 ppm | DS-21:50 ppm | — | SiO$_2$ | M-315 | IC-819 | KBM-903 | ZC-150 OXT-191 |

TABLE 1-continued

|  | trans-parent resin compo-sition | resin (A) | organic solvent (B) | surfactant (C) | | | others | | | | |
|---|---|---|---|---|---|---|---|---|---|---|---|
|  |  |  |  | surfac-tant (C1) | surfac-tant (C2) | other surfac-tant | inorgan-ic parti-cles | reactive mono-mer | photo-sensitive agent | adhe-sion im-prover | curing agent |
| Example 3 | C-3 | siloxane resin (PS-1) | PGMEA/MMB/ DAA | BYK-3550:100 ppm | DS-21:100 ppm | — | $SiO_2$ | M-315 | IC-819 | KBM-903 | ZC-150 OXT-191 |
| Example 4 | C-4 | siloxane resin (PS-1) | PGMEA/MMB/ DAA | BYK-3550:200 ppm | DS-21:200 ppm | — | $SiO_2$ | M-315 | IC-819 | KBM-903 | ZC-150 OXT-191 |
| Example 5 | C-5 | siloxane resin (PS-1) | PGMEA/MMB/ DAA | BYK-3550:50 ppm | DS-21:50 ppm | BYK-333:50 ppm | $SiO_2$ | M-315 | IC-819 | KBM-903 | ZC-150 OXT-191 |
| Example 6 | C-6 | siloxane resin (PS-1) | PGMEA/MMB/ DAA | BYK-3550:150 ppm | DS-21:50 ppm | — | $SiO_2$ | M-315 | IC-819 | KBM-903 | ZC-150 OXT-191 |
| Example 7 | C-7 | siloxane resin (PS-1) | PGMEA/MMB/ DAA | BYK-3550:50 ppm | DS-21:150 ppm | — | $SiO_2$ | M-315 | IC-819 | KBM-903 | ZC-150 OXT-191 |
| Example 8 | C-8 | siloxane resin (PS-2) | PGMEA/MMB/ DAA | BYK-3550:100 ppm | DS-21:100 ppm | — | — | — | — | — | — |
| Example 9 | C-9 | siloxane resin (PS-2) | PGMEA/MMB/ DAA | BYK-3550:100 ppm | DS-21:100 ppm | — | $TiO_2$ | — | — | — | — |
| Example 10 | C-10 | siloxane resin (PS-3) | PGMEA/MMB/ DAA | BYK-3550:100 ppm | DS-21:100 ppm | — | — | — | — | — | — |
| Example 11 | C-11 | siloxane resin (PS-4) | PGMEA/MMB/ DAA | BYK-3550:100 ppm | DS-21:100 ppm | — | $SiO_2$ | — | TAS-200 A | KBM-9659 | MDT |
| Example 12 | C-12 | siloxane resin (PS-4) | PGMEA/MMB/ DAA | BYK-3550:100 ppm | DS-21:100 ppm | — | $SiO_2$ | — | — | KBM-9659 | MDT |
| Comparative example 1 | C-13 | siloxane resin (PS-1) | PGMEA/MMB/ DAA | — | — | BYK-333:200 ppm | $SiO_2$ | M-315 | IC-819 | KBM-903 | ZC-150 OXT-191 |
| Comparative example 2 | C-14 | siloxane resin (PS-1) | PGMEA/MMB/ DAA | — | — | F-477:200 ppm | $SiO_2$ | M-315 | IC-819 | KBM-903 | ZC-150 OXT-191 |
| Comparative example 3 | C-15 | siloxane resin (PS-1) | PGMEA/MMB/ DAA | BYK-3550:200 ppm | — | — | $SiO_2$ | M-315 | IC-819 | KBM-903 | ZC-150 OXT-191 |
| Comparative example 4 | C-16 | siloxane resin (PS-1) | PGMEA/MMB/ DAA | — | DS-21:200 ppm | — | $SiO_2$ | M-315 | IC-819 | KBM-903 | ZC-150 OXT-191 |
| Comparative example 5 | C-17 | siloxane resin (PS-1) | PGMEA/MMB/ DAA | BYK-3550:10 ppm | DS-21:10 ppm | — | $SiO_2$ | M-315 | IC-819 | KBM-903 | ZC-150 OXT-191 |
| Comparative example 6 | C-18 | siloxane resin (PS-1) | PGMEA/MMB/ DAA | BYK-3550:300 ppm | DS-21:300 ppm | — | $SiO_2$ | M-315 | IC-819 | KBM-903 | ZC-150 OXT-191 |
| Comparative example 7 | C-19 | siloxane resin (PS-1) | PGMEA/MMB/ DAA | BYK-3550:100 ppm | — | F-477:100 ppm | $SiO_2$ | M-315 | IC-819 | KBM-903 | ZC-150 OXT-191 |
| Comparative example 8 | A-1 | acrylic resin (PA-1) | PGMEA/MMB/ DAA | BYK-3550:100 ppm | DS-21:100 ppm | — | — | M-315 DPHA | IC-819 | KBM-903 | — |

TABLE 2

| | transparent resin composition | Evaluation results | | | | | | | | |
|---|---|---|---|---|---|---|---|---|---|---|
| | | surface tension | contact angle | viscosity | refractive index | transmittance after curing | pin hole in coat film | drying unevenness | glass edge unevenness | glass surface strength | adhesion |
| Example 1 | C-1 | 27.9 mN/m | 8.5° | 6.5 mPa·s | 1.49 | 98% | A | B | A | A | 5 B |
| Example 2 | C-2 | 27.3 mN/m | 8.9° | 6.5 mPa·s | 1.49 | 98% | A | A | A | A | 5 B |
| Example 3 | C-3 | 26.9 mN/m | 9.3° | 6.5 mPa·s | 1.49 | 98% | A | A | A | A | 5B |
| Example 4 | C-4 | 26.4 mN/m | 10.1° | 6.5 mPa·s | 1.49 | 98% | B | A | B | A | 5 B |
| Example 5 | C-5 | 26.8 mN/m | 10.2° | 6.5 mPa·s | 1.49 | 98% | B | A | A | A | 5 B |
| Example 6 | C-6 | 27.6 mN/m | 8.6° | 6.5 mPa·s | 1.49 | 98% | A | B | A | A | 5 B |
| Example 7 | C-7 | 26.2 mN/m | 9.8° | 6.5 mPa·s | 1.49 | 98% | A | A | B | A | 5 B |
| Example 8 | C-8 | 26.9 mN/m | 9.2° | 5.7 mPa·s | 1.44 | 99% | A | B | B | B | 4 B |
| Example 9 | C-9 | 27.0 mN/m | 9.3° | 5.5 mPa·s | 1.49 | 99% | A | A | A | B | 4 B |
| Example 10 | C-10 | 27.0 mN/m | 9.2° | 5.9 mPa·s | 1.50 | 99% | A | A | A | B | 4 B |
| Example 11 | C-11 | 26.5 mN/m | 9.5° | 6.9 mPa·s | 1.50 | 98% | A | A | A | B | 5 B |
| Example 12 | C-12 | 26.5 mN/m | 9.7° | 6.6 mPa·s | 1.49 | 99% | A | A | A | B | 5B |
| Comparative example 1 | C-13 | 25.9 mN/m | 12.1° | 6.5 mPa·s | 1.49 | 98% | C | A | C | A | 3 B |
| Comparative example 2 | C-14 | 26.2 mN/m | 11.5° | 6.5 mPa·s | 1.49 | 98% | C | A | B | A | 3 B |
| Comparative example 3 | C-15 | 28.4 mN/m | 7.9° | 6.5 mPa·s | 1.49 | 98% | A | C | A | A | 5 B |
| Comparative example 4 | C-16 | 26.2 mN/m | 11.0° | 6.5 mPa·s | 1.49 | 98% | C | A | B | A | 5 B |
| Comparative example 5 | C-17 | 28.6 mN/m | 8.2° | 6.5 mPa·s | 1.49 | 98% | A | C | A | A | 5 B |
| Comparative example 6 | C-18 | 25.8 mN/m | 10.6° | 6.5 mPa·s | 1.49 | 98% | B | A | C | A | 5 B |
| Comparative example 7 | C-19 | 26.8 mN/m | 11.0° | 6.5 mPa·s | 1.49 | 98% | C | A | A | A | 3 B |
| Comparative example 8 | A-1 | 26.9 mN/m | 9.1° | 6.0 mPa·s | 1.55 | 97% | A | B | B | A | 0 B |

It is seen that the transparent resin compositions prepared in Examples have good appearance free of significant pin hole and unevenness in the step for forming a transparent coat film on a glass substrate by ink jet coating and in addition develop high glass strength in the step for forming a transparent coat film and good adhesion in the step for forming a laminate film.

INDUSTRIAL APPLICABILITY

The transparent resin composition according to the present invention allows a transparent film having good appearance to be provided as a result of suppressing the formation of pin hole and unevenness when used to coat a glass substrate by spray coating or ink jet coating. Furthermore, the transparent resin layer can develop good adhesion to an organic film or inorganic film formed thereon, permitting efficient production of highly reliable cover glass plates for display devices such as smartphones.

The invention claimed is:

1. A transparent resin composition comprising at least a siloxane resin (A), an organic solvent (B), and a plurality of surfactants (C), the surfactants including a silicon modified acrylic surfactant (C1) and a fluorine-containing heat-decomposable surfactant (C2), and a total content of the surfactants (C1) and (C2) being 50 ppm or more and 500 ppm or less in the transparent resin composition, wherein a contact angle of the transparent resin composition on a non-alkali glass is 1° or more and 12° or less, and wherein a surface tension of the transparent resin composition at 25° C. is 26 mN/m or more and 28 mN/m or less.

2. The transparent resin composition as set forth in claim 1, wherein a ratio of a content of the surfactant (C2) to a content of the surfactant (C1), namely, a content ratio (C2)/(C1), is 0.25 or more and 4.0 or less.

3. The transparent resin composition as set forth in claim 1, wherein a transparent coat film formed from the transparent resin composition has a refractive index of 1.46 to 1.54 at 550 nm.

4. The transparent resin composition as set forth in claim 1, wherein a viscosity of the transparent resin composition at 25° C. is 3 mPa·s or more and 20 mPa·s or less.

5. A photosensitive transparent resin composition from the transparent resin composition as set forth in claim 1, wherein the siloxane resin (A) has a radical polymerizable group and further contains a reactive monomer and a photoradical polymerization initiator.

6. A transparent coat film formed from the transparent resin composition as set forth in claim 1.

7. A transparent resin coated glass substrate having the transparent coat film as set forth in claim 6 on a glass substrate.

8. A decorative glass substrate comprising the transparent coat film as set forth in claim 6 and a colored layer stacked in an order of the transparent coat film on a glass substrate and the colored layer stacked on the transparent coat film.

* * * * *